United States Patent
Udo et al.

(10) Patent No.: US 9,355,655 B1
(45) Date of Patent: May 31, 2016

(54) MAGNETIC CAPPING LAYER STRUCTURE FOR A SPIN TORQUE OSCILLATOR

(71) Applicant: HGST Netherlands B.V., Amsterdam (NL)

(72) Inventors: Yuta Udo, Kanagawa (JP); Mikito Sugiyama, Kanagawa (JP); Katsuro Watanabe, Ibaraki (JP); Masashi Hattori, Kanagawa (JP); Nobuo Yoshida, Kanagawa (JP); Kimitoshi Etoh, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/818,263

(22) Filed: Aug. 4, 2015

(51) Int. Cl.
    *G11B 5/127* (2006.01)
    *G11B 5/31* (2006.01)

(52) U.S. Cl.
    CPC .............. *G11B 5/1278* (2013.01); *G11B 5/314* (2013.01)

(58) Field of Classification Search
    CPC ........ G11B 5/23; G11B 5/1278; G11B 5/314; G11B 5/3146
    USPC ............................................ 360/125.3, 99.08
    See application file for complete search history.

(56) References Cited

U.S. PATENT DOCUMENTS

| | | | |
|---|---|---|---|
| 8,456,967 B1 * | 6/2013 | Mallary ..................... | 369/13.33 |
| 8,547,661 B2 | 10/2013 | Bai | |
| 8,810,946 B2 | 8/2014 | Yasui et al. | |
| 9,001,465 B1 * | 4/2015 | Shimizu et al. ............ | 360/125.3 |
| 2010/0073806 A1 * | 3/2010 | Koui et al. ..................... | 360/75 |
| 2010/0195247 A1 * | 8/2010 | Mochizuki et al. ...... | 360/123.01 |
| 2011/0216447 A1 * | 9/2011 | Li et al. ......................... | 360/313 |
| 2012/0262821 A1 * | 10/2012 | Taguchi et al. ............. | 360/99.08 |
| 2012/0275061 A1 * | 11/2012 | Takagishi et al. ......... | 360/123.05 |
| 2012/0314326 A1 * | 12/2012 | Takeo et al. .............. | 360/125.03 |
| 2013/0114384 A1 * | 5/2013 | Mochizuki et al. ........ | 369/13.15 |
| 2013/0148242 A1 * | 6/2013 | Koui et al. ................ | 360/125.12 |
| 2013/0250456 A1 * | 9/2013 | Yamada et al. ............ | 360/245.3 |
| 2013/0271869 A1 * | 10/2013 | Taguchi et al. ............ | 360/99.08 |
| 2013/0335847 A1 | 12/2013 | Shiroishi | |
| 2014/0063648 A1 | 3/2014 | Shiroishi et al. | |
| 2014/0063658 A1 | 3/2014 | Shimizu et al. | |
| 2014/0104724 A1 | 4/2014 | Shiroishi et al. | |
| 2014/0177092 A1 | 6/2014 | Katada et al. | |
| 2014/0177100 A1 | 6/2014 | Sugiyama et al. | |
| 2015/0092292 A1 * | 4/2015 | Furukawa et al. .............. | 360/59 |

OTHER PUBLICATIONS

Sato et al., "Thin Spin-torque Oscillator With High AC-Field for High Density Microwave-Assisted Magnetic Recording," IEEE Transactions on Magnetics, vol. 49, No. 7, Jul. 2013, pp. 3632-3635.

* cited by examiner

*Primary Examiner* — Brian Miller
(74) *Attorney, Agent, or Firm* — Zilka-Kotab, PC

(57) ABSTRACT

In one embodiment, a magnetic recording head includes: a main pole configured to generate a magnetic field for recording data on a magnetic recording medium; an oscillation device positioned above the main pole in a track direction, the oscillation device being configured to generate a high-frequency magnetic field; a magnetic capping layer positioned above the oscillation device in the track direction, the magnetic layer having a front region at a media facing side (MFS) of the magnetic recording head and a rear region positioned behind the front region in an element height direction, wherein a thickness of the front region of the magnetic capping layer is less than a thickness of the rear region thereof; and a trailing shield positioned above the magnetic capping layer in the track direction.

20 Claims, 17 Drawing Sheets

MAGNETIC CAPPING LAYER STRUCTURE FOR A SPIN TORQUE OSCILLATOR

FIELD OF THE INVENTION

The present invention relates to data storage systems, and more particularly, this invention relates to a microwave assisted magnetic recording (MAMR) head including a magnetic capping layer structure for a spin torque oscillator present therein.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to achieve this desire is to increase the capacity by increasing the recording density of the HDD. To achieve higher recording densities, such as those exceeding 1 Tbit/inch$^2$, further miniaturization of recording bits is effective, which in turn typically requires the design of smaller and smaller components.

The further miniaturization of the various components presents its own set of challenges and obstacles. For instance, as the recording bit size becomes smaller, the loss of a recording state due to thermal fluctuation is of increasing concern. To compensate for thermal instability associated with small recording bits, a magnetic recording medium with a large coercivity may be used. However, recording to a magnetic recording medium with a large coercivity requires a strong magnetic field, which may exceed the amount of magnetic flux capable of being generated by the magnetic recording head.

Microwave assisted magnetic recording (MAMR) has emerged as a promising magnetic recording technique to address the difficulty in maintaining both the thermal stability and write-ability of a magnetic recording medium. In MAMR, an oscillation element or device is located next to or near the write element in order to produce a high-frequency oscillating magnetic field (in addition to a recording magnetic field emanated from a main pole of the write element), which reduces an effective coercivity of a magnetic recording medium used to store data.

To further achieve higher recording densities using a MAMR head, the recording magnetic field and/or the high-frequency magnetic field generated by the main pole and oscillation device, respectively, may be increased. Unfortunately, configuring the structural characteristics and/or properties of the main pole and elements associated therewith to increase the recording magnetic field may be constrained by the structural characteristics and/or properties of the oscillation device, and vice versa. For instance, one method of increasing the recording magnetic field may involve narrowing the trailing gap positioned between the main pole and the trailing shield of a MAMR head. However, the existence of the oscillation device within the trailing gap renders narrowing the trailing gap to a thickness equivalent to or less than the thickness of the oscillation device problematic or impossible.

There are additional challenges associated with forming and using a MAMR head. For example, formation of the stripe height of the oscillation device may generally involve an etching (e.g., milling) and/or cleaning process that results in a non-uniform thickness of the trailing gap and thus a non-uniform thickness in the oscillation device located within.

SUMMARY

According to one embodiment, a magnetic recording head includes: a main pole configured to generate a magnetic field for recording data on a magnetic recording medium; an oscillation device positioned above the main pole in a track direction, the oscillation device being configured to generate a high-frequency magnetic field; a magnetic capping layer positioned above the oscillation device in the track direction, the magnetic layer having a front region at a media facing side (MFS) of the magnetic recording head and a rear region positioned behind the front region in an element height direction, wherein a thickness of the front region of the magnetic capping layer is less than a thickness of the rear region thereof; and a trailing shield positioned above the magnetic capping layer in the track direction.

According to another embodiment, a method for forming a magnetic recording head includes: forming a main pole configured to generate a magnetic field for recording data on a magnetic recording medium; forming an oscillation device above the main pole in a track direction; forming a magnetic capping layer above the oscillation device in the track direction, wherein the magnetic layer is configured to preserve a thickness of the oscillation device; defining a stripe height of the oscillation device and a stipe height of the magnetic capping layer; depositing an insulation layer behind the oscillation device and the magnetic capping layer in an element height direction; and cleaning an upper surface of the magnetic capping layer and an upper surface of the insulation layer. After the cleaning, a thickness of a front region of the magnetic capping layer is less than a thickness of a rear region thereof, the front region being positioned at a media facing side (MFS) of the magnetic recording head and the rear region being positioned behind the front region in the element height direction.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a magnetic recording head includes: a main pole configured to generate a magnetic field for recording data on a magnetic recording medium; an oscillation device positioned above the main pole in a track direction, the oscillation device being configured to generate a high-frequency magnetic field; a magnetic capping layer positioned above the oscillation device in the track direction, the magnetic layer having a front region at a media facing side (MFS) of the magnetic recording head and a rear region positioned behind the front region in an element height direction, wherein a thickness of the front region of the magnetic capping layer is less than a thickness of the rear region thereof; and a trailing shield positioned above the magnetic capping layer in the track direction.

In another general embodiment, a method for forming a magnetic recording head includes: forming a main pole configured to generate a magnetic field for recording data on a magnetic recording medium; forming an oscillation device above the main pole in a track direction; forming a magnetic capping layer above the oscillation device in the track direction, wherein the magnetic layer is configured to preserve a thickness of the oscillation device; defining a stripe height of the oscillation device and a stipe height of the magnetic capping layer; depositing an insulation layer behind the oscillation device and the magnetic capping layer in an element height direction; and cleaning an upper surface of the magnetic capping layer and an upper surface of the insulation layer. After the cleaning, a thickness of a front region of the magnetic capping layer is less than a thickness of a rear region thereof, the front region being positioned at a media facing side (MFS) of the magnetic recording head and the rear region being positioned behind the front region in the element height direction.

Figure 1:
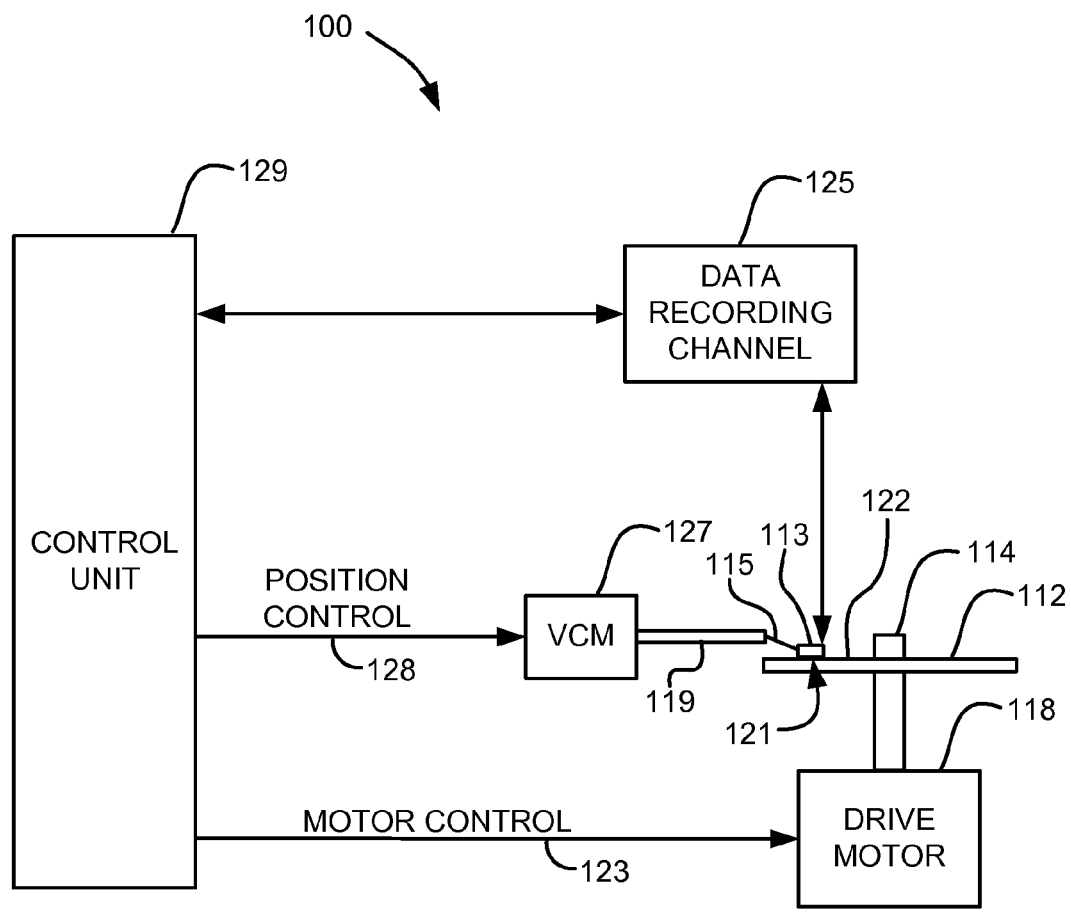
FIG. 1 is a simplified drawing of a magnetic recording disk drive system, according to one embodiment.

Referring now to FIG. 1, there is shown a disk drive 100 in accordance with one embodiment of the present invention. As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
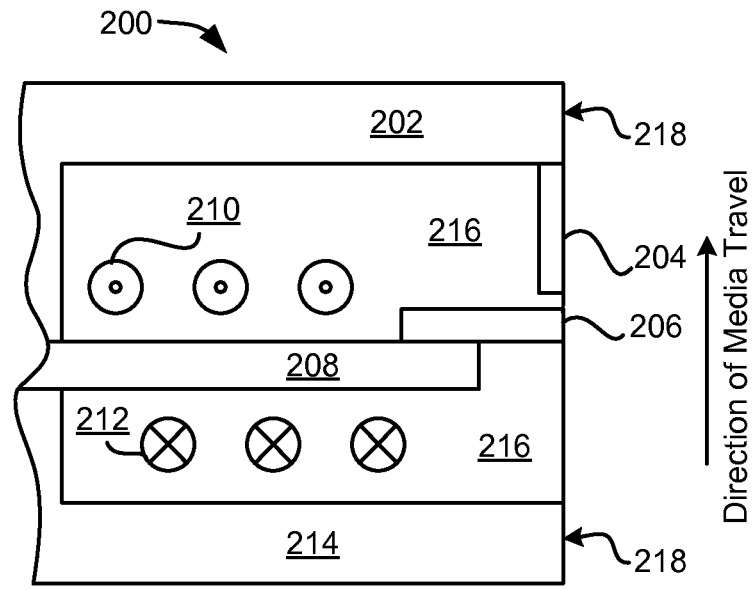
FIG. 2A is a cross-sectional view of a perpendicular magnetic head with helical coils, according to one embodiment.

FIG. 2A is a cross-sectional view of a perpendicular magnetic head 200, according to one embodiment. In FIG. 2A, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

Figure 2B:
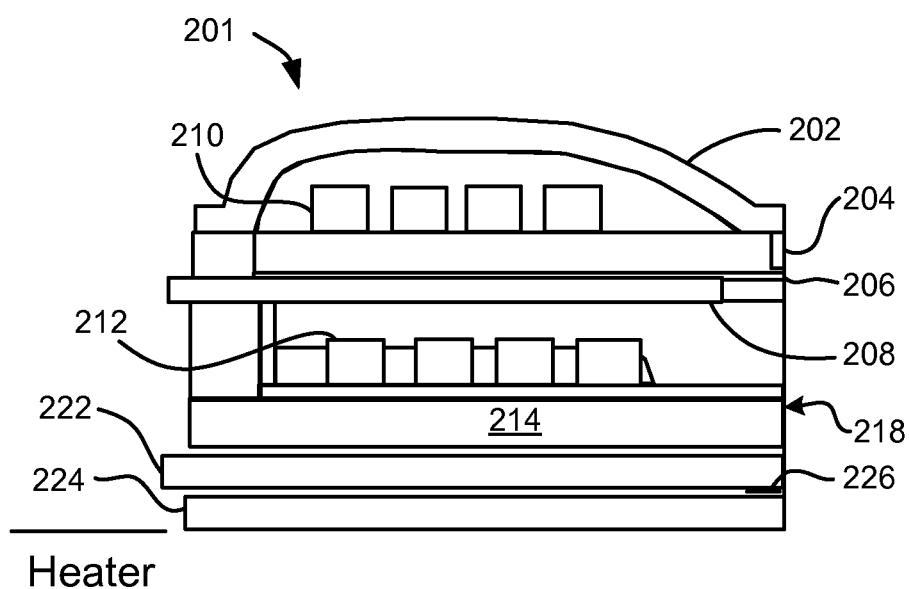
FIG. 2B is a cross-sectional view a piggyback magnetic head with helical coils, according to one embodiment.

FIG. 2B illustrates one embodiment of a piggyback magnetic head 201 having similar features to the head 200 of FIG. 2A. As shown in FIG. 2B, two shields 204, 214 flank the stitch pole 208 and main pole 206. Also sensor shields 222, 224 are shown. The sensor 226 is typically positioned between the sensor shields 222, 224.

Figure 3A:
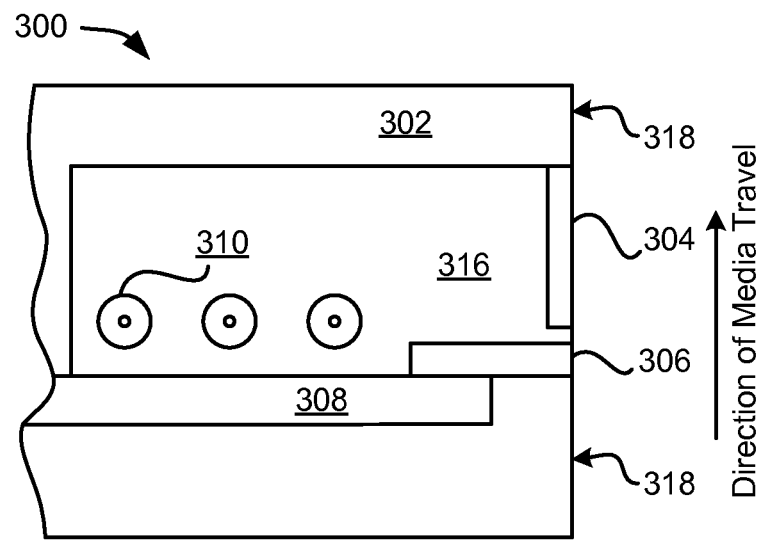
FIG. 3A is a cross-sectional view of a perpendicular magnetic head with looped coils, according to one embodiment.

FIG. 3A is a schematic diagram of another embodiment of a perpendicular magnetic head 300, which uses looped coils 310 to provide flux to the stitch pole 308, a configuration that is sometimes referred to as a pancake configuration. The stitch pole 308 provides the flux to the main pole 306. With this arrangement, the lower return pole may be optional. Insulation 316 surrounds the coils 310, and may provide support for the stitch pole 308 and main pole 306. The stitch pole may be recessed from the ABS 318. The direction of the media travel, as indicated by the arrow to the right of the structure, moves the media past the stitch pole 308, main pole 306, trailing shield 304 which may be connected to the wrap around shield (not shown), and finally past the upper return pole 302 (all of which may or may not have a portion in contact with the ABS 318). The ABS 318 is indicated across the right side of the structure. The trailing shield 304 may be in contact with the main pole 306 in some embodiments.

Figure 3B:
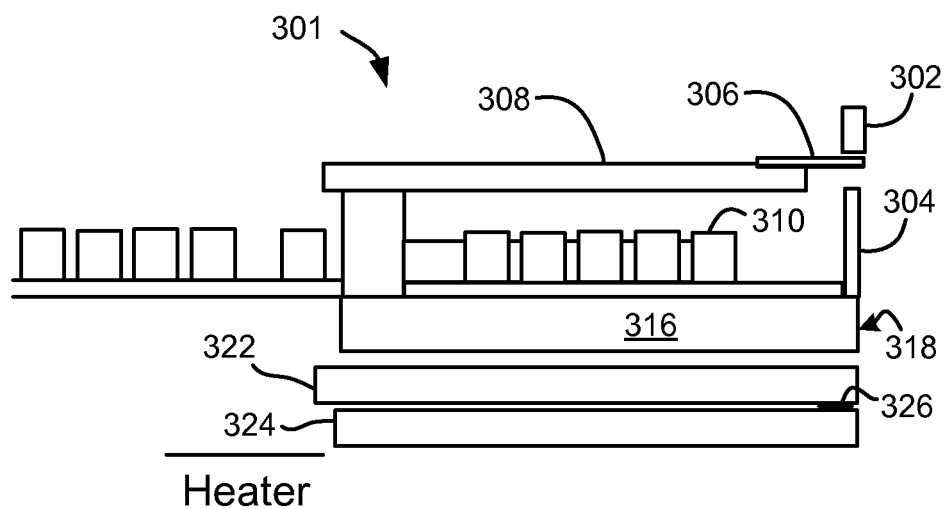
FIG. 3B is a cross-sectional view of a piggyback magnetic head with looped coils, according to one embodiment.

FIG. 3B illustrates another embodiment of a piggyback magnetic head 301 having similar features to the head 300 of FIG. 3A. As shown in FIG. 3B, the piggyback magnetic head 301 also includes a looped coil 310, which wraps around to form a pancake coil. Sensor shields 322, 324 are additionally shown. The sensor 326 is typically positioned between the sensor shields 322, 324.

In FIGS. 2B and 3B, an optional heater is shown near the non-ABS side of the magnetic head. A heater (Heater) may also be included in the magnetic heads shown in FIGS. 2A and 3A. The position of this heater may vary based on design parameters such as where the protrusion is desired, coefficients of thermal expansion of the surrounding layers, etc.

Figure 4:
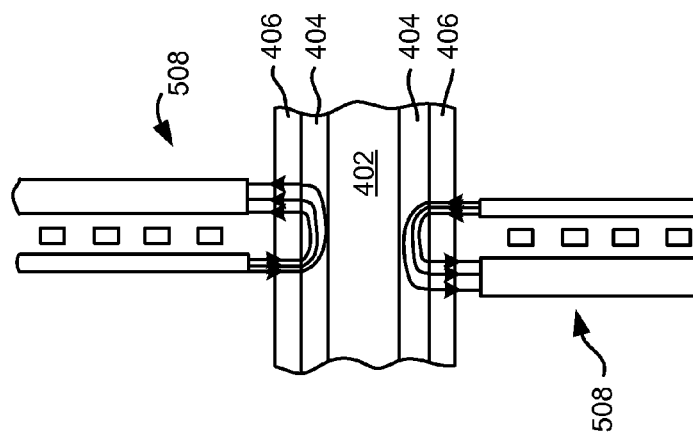
FIG. 4 is a schematic representation of a perpendicular recording medium, according to one embodiment.

FIG. 4 provides a schematic diagram of a simplified perpendicular recording medium 400, which may also be used with magnetic disk recording systems, such as that shown in FIG. 1. As shown in FIG. 4, the perpendicular recording medium 400, which may be a recording disk in various approaches, comprises at least a supporting substrate 402 of a suitable non-magnetic material (e.g., glass, aluminum, etc.), and a soft magnetic underlayer 404 of a material having a high magnetic permeability positioned above the substrate 402. The perpendicular recording medium 400 also includes a magnetic recording layer 406 positioned above the soft magnetic underlayer 404, where the magnetic recording layer 406 preferably has a high coercivity relative to the soft magnetic underlayer 404. There may one or more additional layers (not shown), such as an "exchange-break" layer or "interlayer", between the soft magnetic underlayer 404 and the magnetic recording layer 406.

The orientation of magnetic impulses in the magnetic recording layer 406 is substantially perpendicular to the surface of the recording layer. The magnetization of the soft magnetic underlayer 404 is oriented in (or parallel to) the plane of the soft underlayer 404. As particularly shown in FIG. 4, the in-plane magnetization of the soft magnetic underlayer 404 may be represented by an arrow extending into the paper.

Figure 5A:
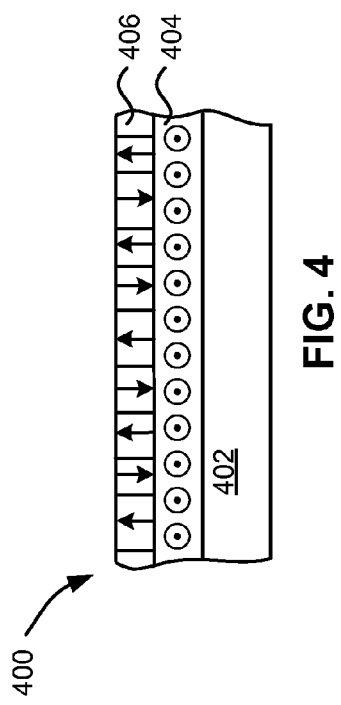
FIG. 5A is a schematic representation of a recording head and the perpendicular recording medium of FIG. 4, according to one embodiment.

FIG. 5A illustrates the operative relationship between a perpendicular head 508 and the perpendicular recording medium 400 of FIG. 4. As shown in FIG. 5A, the magnetic flux 510, which extends between the main pole 512 and return pole 514 of the perpendicular head 508, loops into and out of the magnetic recording layer 406 and soft magnetic underlayer 404. The soft magnetic underlayer 404 helps focus the magnetic flux 510 from the perpendicular head 508 into the magnetic recording layer 406 in a direction generally perpendicular to the surface of the magnetic medium. Accordingly, the intense magnetic field generated between the perpendicular head 508 and the soft magnetic underlayer 404, enables information to be recorded in the magnetic recording layer 406. The magnetic flux is further channeled by the soft magnetic underlayer 404 back to the return pole 514 of the head 508.

As noted above, the magnetization of the soft magnetic underlayer 404 is oriented in (parallel to) the plane of the soft magnetic underlayer 404, and may represented by an arrow extending into the paper. However, as shown in FIG. 5A, this in plane magnetization of the soft magnetic underlayer 404 may rotate in regions that are exposed to the magnetic flux 510.

Figure 5B:
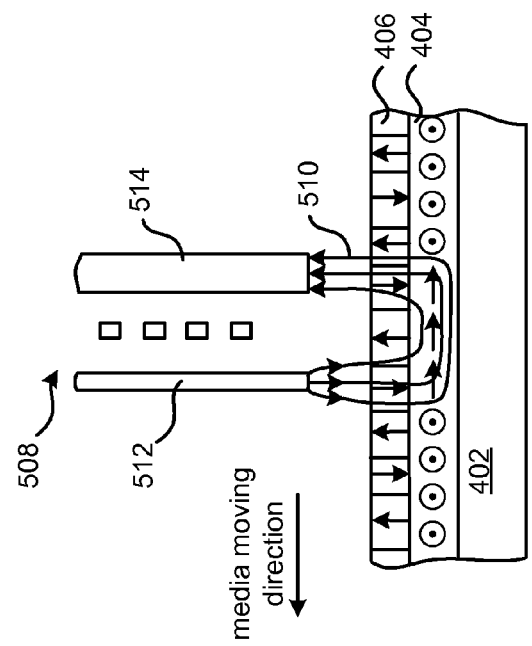
FIG. 5B is a schematic representation of a recording apparatus configured to record separately on both sides of a perpendicular recording medium, according to one embodiment.

FIG. 5B illustrates one embodiment of the structure shown in FIG. 5A, where soft magnetic underlayers 404 and magnetic recording layers 406 are positioned on opposite sides of the substrate 402, along with suitable recording heads 508 positioned adjacent the outer surface of the magnetic recording layers 406, thereby allowing recording on each side of the medium.

Except as otherwise described herein with reference to the various inventive embodiments, the various components of the structures of FIGS. 1-5B, and of other embodiments disclosed herein, may be of conventional material(s), design, and/or fabricated using conventional techniques, as would become apparent to one skilled in the art upon reading the present disclosure.

Figure 6A:
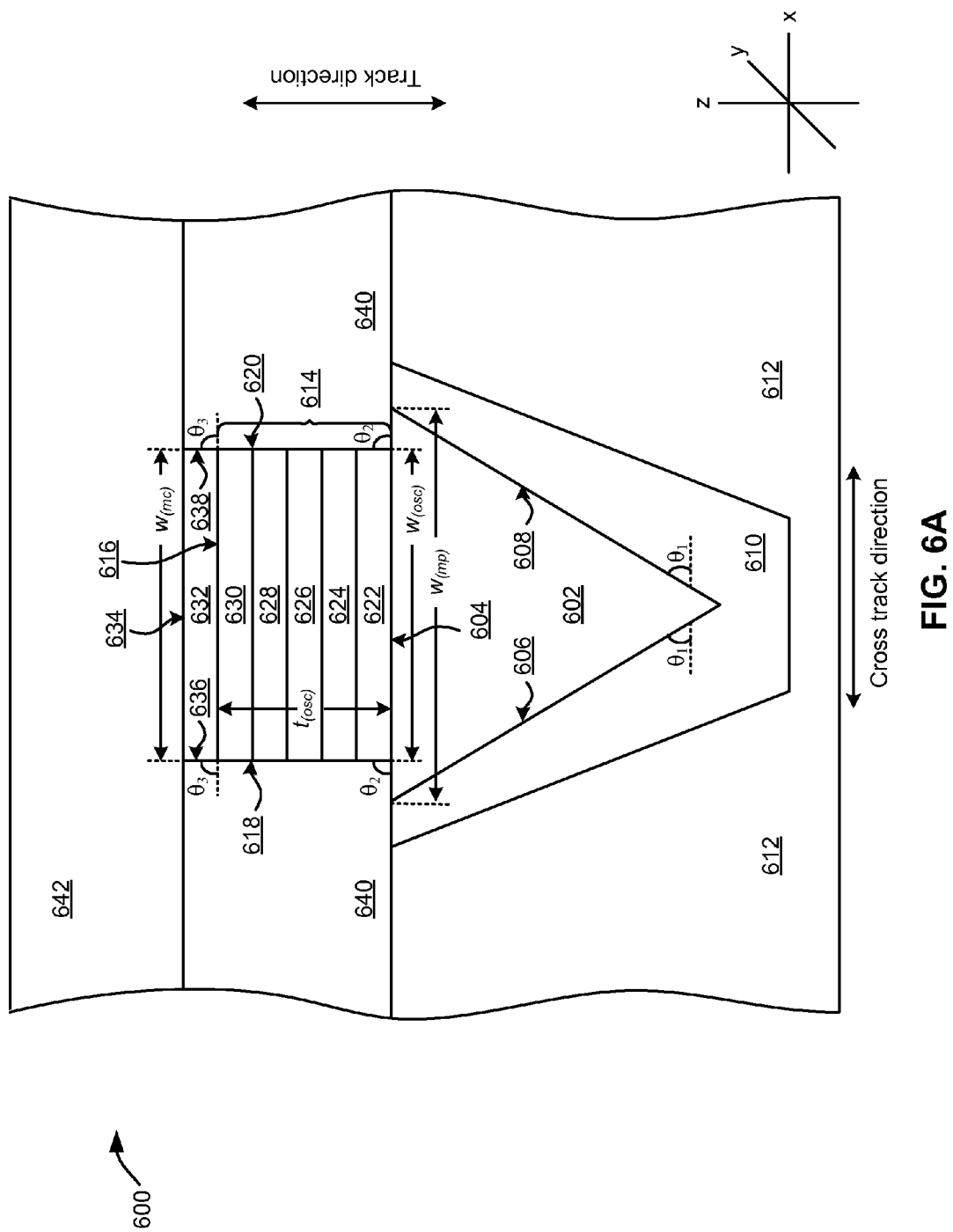
FIG. 6A is a media facing side (MFS) view of a schematic representation of a microwave assisted magnetic recording (MAMR) head, according to one embodiment.

Referring now to FIG. 6A, a media facing side (MFS) view of a simplified MAMR head 600 is shown according to one embodiment. As an option, the MAMR head 600 may be implemented in conjunction with features from any other embodiment listed herein, such as those described with reference to the other FIGS. Of course, the MAMR head 600 and others presented herein may be used in various applications and/or in permutations which may or may not be specifically described in the illustrative embodiments listed herein. For instance, the MAMR head 600 may include more or less components than those shown in FIG. 6A, in various approaches. Moreover, unless otherwise specified, one or more components of the MAMR head 600 may be of conventional material(s), design, and/or fabricated using conventional techniques (e.g., sputtering, plating, atomic layer deposition (ALD), chemical vapor deposition (CVD), ion milling, etc.), as would become apparent to one skilled in the art upon reading the present disclosure.

As particularly shown in FIG. 6A, the MAMR head 600 includes a main pole 602 configured to generate a recording magnetic field when current is applied to a write coil. The main pole 602 includes an upper surface 604, and first and second side surfaces 606, 608.

In various approaches, the main pole 602 may have a generally triangular shape as shown. Accordingly, the first and second side surfaces 606, 608 may be angled at a first angle of inclination, $\theta_1$, relative to a plane of deposition of the MAMR head 600 (i.e., the x-y plane in FIG. 6A). In preferred approaches, the first angle of inclination, $\theta_1$, may be in a range from greater than 0° to less than or equal to 90°. It is important to note, however, that the main pole 602 is not limited to a triangular shape, and may include a trapezoidal shape in some approaches, or other such suitable shapes as would become apparent to one having skill in the art upon reading the present disclosure.

In additional approaches, the main pole 602 may include one or more magnetic metals, such as Fe, Co, Ni, alloys thereof, etc.

A side gap 610 may be present on either side of the main pole 602 in the cross track direction. In preferred approaches, the side gap 610 may comprise a non-magnetic material such as alumina, $TiO_2$, $SiO_2$, $Al_2O_3$—$SiO_2$, etc.

A magnetic side shield 612 may be present on either side of the side gap 610 in the cross track direction. The magnetic side shield 612 may comprise one or more magnetic materials, including but not limited to Ni, Fe, Co, alloys thereof, etc.

As also shown in FIG. 6A, an oscillation device 614 is positioned above a portion of the main pole 602 in the track direction (i.e., the direction in which a magnetic recording medium advances). The oscillation device includes an upper surface 616 and first and second side surfaces, 618, 620.

The first and second side surfaces 618, 620 of the oscillation device 614 may be angled at a second angle of inclination, $\theta_2$, relative to the plane of deposition of the MAMR head 600. As shown in the embodiment of FIG. 6A, the second angle of inclination, $\theta_2$, may be about 90° relative to the plane of deposition of the MAMR head 600. However, in other approaches, the second angle of inclination, $\theta_2$, may be in a range that is greater than 0° and less than or equal to about 90° relative to the plane of deposition of the MAMR head 600. In yet more approaches, the second angle of inclination, $\theta_2$, may be about equal to the first angle of inclination, $\theta_1$.

In some approaches, the width, $w_{(osc)}$, of the oscillation device 614 in the cross track direction may be less than a width, $w_{(mp)}$, of the upper surface 604 of the main pole, as shown. In more approaches, the width $w_{(osc)}$ may be about equal to than the width $w_{(mp)}$.

In particular approaches, the thickness, $t_{(osc)}$, of the oscillation device 614 may be uniform in the cross track direction. In more approaches, the thickness, $t_{(osc)}$, of the oscillation device may define the thickness of the trailing gap (TG).

In some approaches, the oscillation device 614 may be a spin torque oscillator (STO), as shown in the embodiment of FIG. 6A. The oscillation device 614 may thus include an underlayer 622 configured to promote a desired grain growth and magnetization in the layers formed thereabove. In various approaches, the underlayer 622 may include one or more layers that comprise at least one of Cu, Ag, Au, Cr, Pt, Ti, Zr, Hf, V, Nb, Ta, Ru, Os, Pd, Pt, Rh, Ir, alloys thereof, etc. In one particular approach, the underlayer 622 may comprise a first layer including Cu, and a second layer positioned thereabove in the track direction including Ta.

The oscillation device 614 may also include a spin polarization layer 624 positioned above the underlayer 622 in the track direction. In preferred approaches, the spin polarization layer (SPL) 624 may have a magnetic anisotropy oriented perpendicular to the plane of deposition of the MAMR head 600. The SPL 624 may be chosen such that when an electric current flows to the oscillation device 614, the electron spin produced by the SPL 624 has the same orientation thereof. These electrons impart a torque ("spin torque") to the magnetization of the high-frequency magnetic field generation layer (FGL) 628 and, as a result, a magnetization rotation of the FGL 628 occurs. This magnetization rotation of the FGL 628 forms the high-frequency magnetic field emitted by the oscillation device 614. In various approaches, the SPL 624 may include at least one of CoPt, CoNi, CoPd, CoCrTaPd, or other suitable magnetic material as would become apparent to one having skill in the art upon reading the present disclosure.

The oscillation device 614 further includes an intermediate layer 626 positioned between the SPL 624 and the FGL 628 in the track direction. In some approaches, the intermediate layer 626 may include one or more non-magnetic materials, including but not limited to, Au, Ag, Pt, Ta, Ir, Al, Si, Ge, Ti, Cu, Pd, Ru, Mo, W, alloys thereof, etc.

In more approaches, the FGL 628 may include one or more magnetic materials, including but not limited to FeCo, NiFe, CoPt, CoCr, CoIr, CoFeAli, CoFeGe, CoMnGe, CoFeAl, CoFeSi, CoMnSi, TbFeCo, etc.

The oscillation device 614 additionally includes a non-magnetic capping layer 630 positioned above the FGL 628. In various approaches, the non-magnetic capping layer 630 may include one or more layers that comprise at least one of NiCr, NiFe, Cr, Pt, Ir, Ta, Ru, alloys thereof, etc. In one particular approach, the non-magnetic capping layer 630 may comprise: a first layer including NiCr; a second layer positioned above the first layer in the track direction, the second layer including Ir; a third layer positioned above the second layer in the track direction, the third layer including Ta; and a fourth layer positioned above the third layer in the track direction, the fourth layer including Ru.

As also shown in FIG. 6A, a magnetic capping layer 632 is positioned above the oscillation device 614 in the track direction. The magnetic capping layer 632 includes an upper surface 634 and first and second side surfaces 636, 638. The first and second side surfaces 636, 638 of the magnetic capping layer 632 may be angled at a third angle of inclination, $\theta_3$, relative to the plane of deposition of the MAMR head 600. As shown in the embodiment of FIG. 6A, the third angle of inclination, $\theta_3$, may be about 90° relative to the plane of deposition of the MAMR head 600. However, in other approaches, the third angle of inclination, $\theta_3$, may be in a range that is greater than 0° and less than or equal to about 90° relative to the plane of deposition of the MAMR head 600. In yet more approaches, the third angle of inclination, $\theta_3$, may be about equal to the second angle of inclination, $\theta_2$.

The width, $w_{mc}$, of the magnetic capping layer 632 may be about equal to the width, $w_{(osc)}$, of the oscillation device 614 in various approaches. Moreover, the magnetic capping layer 632 may be configured to preserve the thickness of oscillation device 614.

In various approaches, the magnetic capping layer 632 may include one or more magnetic materials, including, but not limited to, Fe, Co, Ni, alloys thereof, etc.

A track width (TW) insulation layer 640 may be positioned on either side of the oscillation device 614 and the magnetic capping layer 632 in the cross track direction. The TW insulation layer 640 may comprise a non-magnetic material such as alumina, $TiO_2$, $SiO_2$, $Al_2O_3$—$SiO_2$, etc. In some approaches, the thickness, in the track direction, of the portion of the TW insulation layer 640 present at the MFS of the MAMR head 600 may be about equal to or greater than a combined thickness of the oscillation device 614 and the magnetic capping layer 632 at the MFS.

As further shown in FIG. 6A, a trailing shield 642 is positioned above the magnetic capping layer 632 and the TW insulation layer 640. The trailing shield 642 may include one or more magnetic materials, such as Fe, Co, Ni, alloys thereof, etc., in various approaches. In some approaches, the trailing shield 642 and the magnetic capping layer 632 may be magnetically coupled. In one particular approach, the trailing shield 642 and the magnetic capping layer 632 may include at least one magnetic material in common.

While not shown in FIG. 6A, a trailing shield seed layer may be positioned between at least the magnetic capping layer 632 and the trailing shield 642. In some approaches, the trailing shield seed layer may include an electrically conductive material, and have a high magnetic saturation moment so as to function as a part of the trailing shield 642. Alternatively, the trailing shield seed layer may be an electrically conductive non-magnetic material (e.g., Ru, Rh, etc.) so as to function as a gap layer and an electroplating seed layer.

Figure 6B:
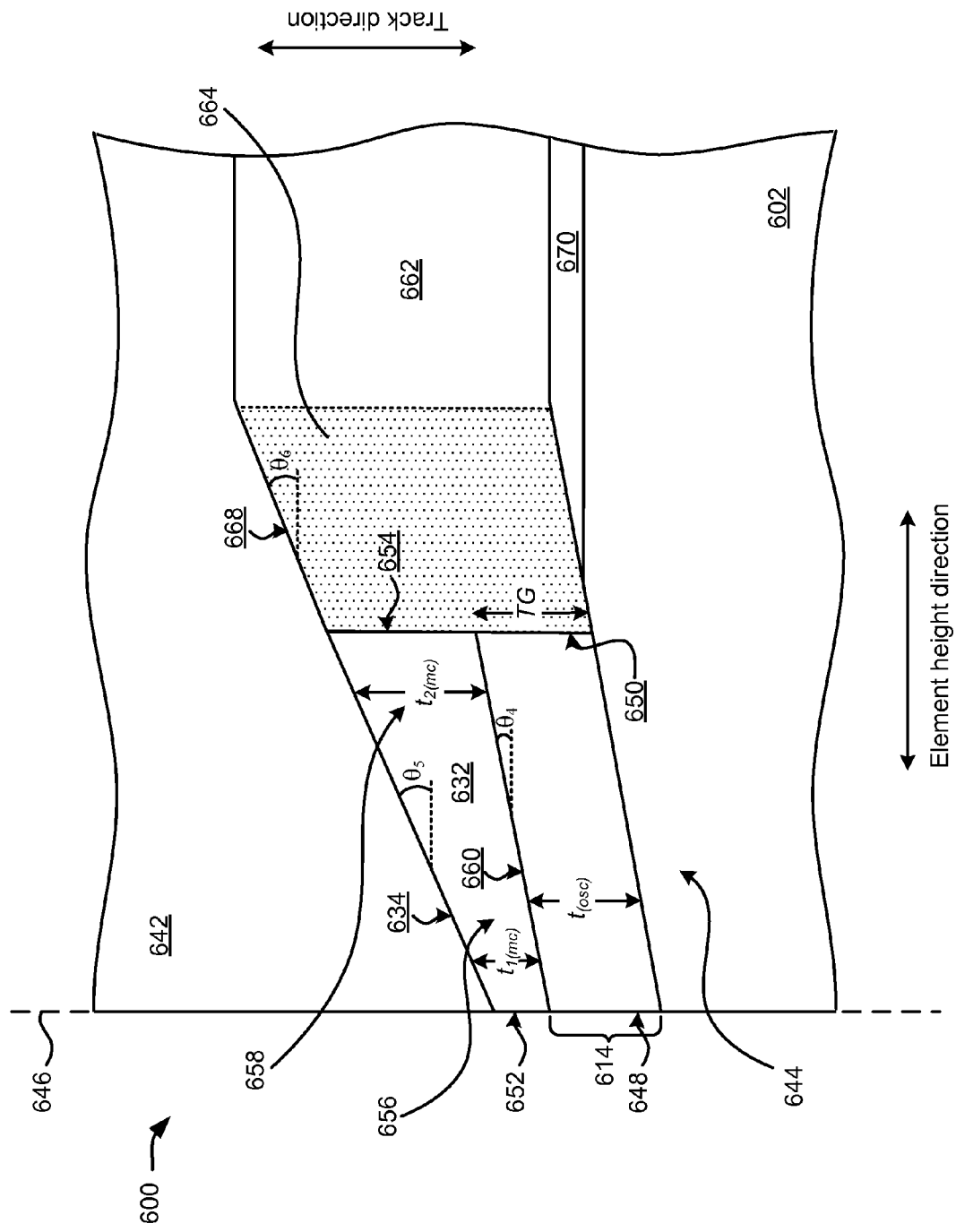
FIG. 6B is a cross-sectional view of the MAMR head of FIG. 6A.

Referring now to FIG. 6B, a cross-sectional view of the MAMR head 600 described above in FIG. 6A is shown according to one embodiment. As shown in FIG. 6B, the main pole 602 includes a tapered region 644 having a tapered upper surface on an end near the MFS 646.

As also shown in FIG. 6B, the oscillation device 614 is located on the tapered region 644 of the main pole 602. The oscillation device also has a front edge 648 located at the MFS 646 and a back edge 650 positioned therebehind in the element height direction. The distance between the front and back edges 648, 650 of the oscillation device 614 in the element height direction is referred to as the stripe height of the oscillation device 614. In preferred approaches, the thickness of the oscillation device 614 may be uniform in the element height direction. In more preferred approaches, the thickness of the oscillation device may be uniform in both the cross track and element height directions.

As also shown in FIG. 6B, the magnetic capping layer 632 has a front edge 652 located at the MFS 646 and a back edge 654 positioned therebehind in the element height direction. The magnetic capping layer 632 also includes a front region 656 located at or near the front edge 652, and a rear region 658 located at or near the back edge 654.

In particular approaches, the thickness of the magnetic capping layer 632 may be about uniform in the cross track direction, but may increase from the front edge 652 to the back edge 654 in the element height direction. For instance, in preferred approaches, the thickness, $t_{1(mc)}$, of the front region 656 of the magnetic capping layer 632 may be less than the thickness, $t_{2(mc)}$, of the rear region 658 of the magnetic capping layer 632. In some approaches, the thickness of $t_{1(mc)}$ may be in a range from about 4 nm to less than about 25 nm, and the thickness of $t_{2(mc)}$ be in a range from greater than about 4 nm to about 25 nm. In one particular approach, the thickness $t_{1(mc)}$ may be in a range from about 4 nm to about 8 nm, whereas the thickness $t_{2(mc)}$ may be in a range from about 9 nm to about 25 nm.

The lower surface 660 of the magnetic capping layer 632 may lie along substantially the same plane, where said plane is angled at a fourth angle of inclination, $\theta_4$, relative to the plane of deposition of the MAMR head 600, as shown in the embodiment of FIG. 6B. The fourth angle of inclination, $\theta_4$, may preferably be in a range from greater than 0° to less than 90° relative to the plane of deposition of the MAMR head 600.

The upper surface 634 of the magnetic capping layer 632 may lie along substantially the same plane, where said plane is angled at a fifth angle of inclination, $\theta_5$, relative to the plane of deposition of the MAMR head 600, as shown in the embodiment of FIG. 6B. The fifth angle of inclination, $\theta_5$, may preferably be in a range from greater than 0° to less than 90° relative to the plane of deposition of the MAMR head 600. Moreover, in particular approaches, the fifth angle of inclination, $\theta_5$, may be greater than the fourth angle of inclination, $\theta_4$, a configuration which results in the thickness, $t_{1(mc)}$, of the front region 656 of the magnetic capping layer 632 being less than the thickness, $t_{2(mc)}$, of the rear region 658 thereof.

As further shown in FIG. 6B, a stripe height (SH) insulation layer 662 is positioned behind the back edges 650, 654 of the oscillation device 614 and the magnetic capping layer 632, respectively. The SH insulation layer 662 may comprise a non-magnetic material such as alumina, $TiO_2$, $SiO_2$, $Al_2O_3$—$SiO_2$, etc. In some approaches, SH insulation layer 662 may comprise one or more of the same non-magnetic materials as the TW insulation layer 640 (not shown in the cross-sectional view provided in FIG. 6B); however, in other approaches, the SH and TW insulation layers 662, 640 may comprise different non-magnetic materials.

The SH insulation layer 662 may include a forward region 664 having an upper surface 668 on an end near the back edges 650, 654 of the oscillation device 614 and the magnetic capping layer 632, respectively.

The thickness of the forward region 664 of the SH insulation layer 662 may increase toward a back edge of the forward region 664 in the element height direction relative to the MFS 646.

In some approaches, at least a portion of the upper surface 668 of the forward region 664 of the SH insulation layer 662 may be angled at a sixth angle of inclination, $\theta_6$, relative to the plane of deposition of the MAMR head 600. Preferably, the sixth angle of inclination, $\theta_6$, may be in a range from greater than 0° to less than 90° relative to the plane of deposition of the MAMR head 600. In some approaches, the sixth angle of inclination, $\theta_6$, may be about equal to or greater than the fifth angle of inclination, $\theta_5$.

In more approaches, at least a portion of the upper surface 668 of the forward region 664 of SH insulation layer 662 may lie in substantially the same plane as a portion of the upper surface 634 of the magnetic capping layer 632.

As also shown in FIG. 6B, a non-magnetic bump layer 670 may be included between the main pole 602 and the SH insulation layer 640. In some approaches, the non-magnetic bump layer may be a continuation of the SH insulation layer 662 material. In other approaches, the non-magnetic bump layer 670 and the SH insulation layer 662 may include different non-magnetic materials.

As discussed previously, the upper surface 634 of the magnetic capping layer 632 may lie in substantially the same plane angled at the third angled of inclination, $\theta_3$, relative to the plane of deposition of the MAMR head 600. It is important to note, however, that in alternative approaches, one or more portions of the upper surface 634 of the magnetic capping layer 632 may be angled at different angles of inclination relative to the plane of deposition of the MAMR head 600, provided again that the thickness, $t_{1(mc)}$, is less than the thickness, $t_{2(mc)}$. For example, at least two portions of the upper surface 634 of the magnetic capping layer 632 may be angled at different angles of inclination relative to the plane of deposition of the MAMR head 600; at least three portions of the upper surface 634 of the magnetic capping layer 632 may be angled at different angles of inclination relative to the plane of deposition of the MAMR head 600; etc.

Figure 6C:
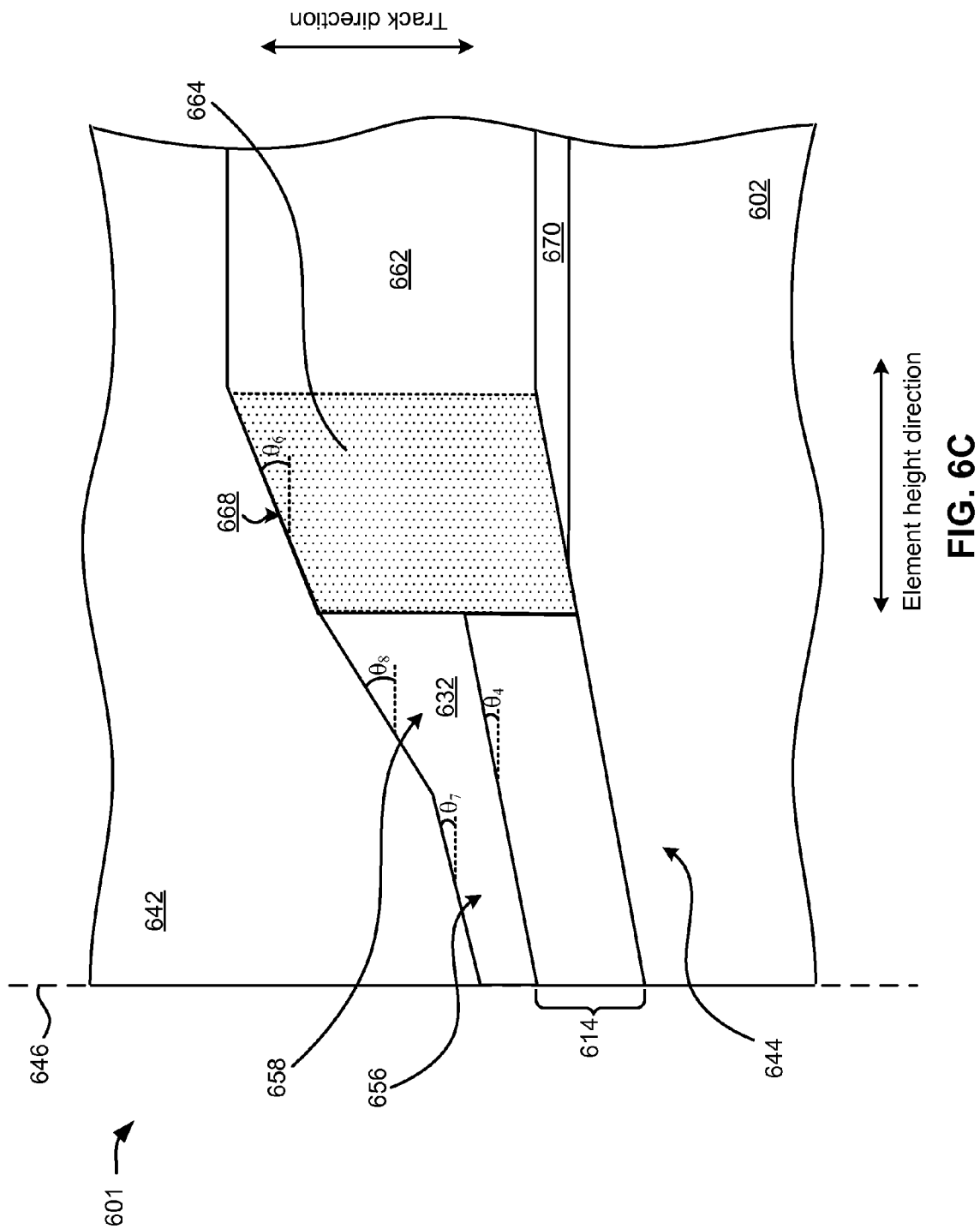
FIG. 6C is cross-sectional view of a schematic representation of a MAMR head, according to another embodiment.

FIG. 6C, illustrates one non-limiting embodiment of a MAMR head 601 in which two portions of the upper surface 634 of the magnetic capping layer 632 are angled at different angles of inclination relative to the plane of deposition of the MAMR head 600. As the MAMR head 601 of FIG. 6B is a variation of the MAMR head 600 of FIGS. 6A-6B, features of the MAMR head 601 of FIG. 6B may have common numbering with those of the MAMR head 600 embodied in FIGS. 6A-6B.

As particularly shown in FIG. 6C, the front region 656 and the rear region 658 of the magnetic capping layer 632 are angled at a seventh angle of inclination, $\theta_7$, and an eighth angle of inclination, $\theta_8$, respectively, relative to the plane of deposition of the MAMR head 600. The angles $\theta_7$ and $\theta_8$ may each independently be in a range from greater than 0° to less than 90° relative to the plane of deposition of the MAMR head 600, with the proviso that $\theta_8 > \theta_7$, as shown in the embodiment of FIG. 6C. The angle $\theta_7$ may also be about equal to or greater than $\theta_4$, and the angle $\theta_8$ may be greater than $\theta_4$, in some approaches.

As additionally shown in FIG. 6C, at least a portion of the upper surface 668 of the forward region 664 of the SH insulation layer 662 may be angled at the sixth angle of inclination, $\theta_6$, relative to the plane of deposition of the MAMR head 600. In some approaches, the sixth angle of inclination, $\theta_6$, may be about equal to or greater than the seventh angle of inclination, $\theta_7$, or the eighth angle of inclination, $\theta_8$. In more approaches, at least a portion of the upper surface 668 of the forward region 664 of the SH insulation layer 662 may lie in substantially the same plane as at least a portion of the upper surface 634 of the magnetic capping layer 632.

Referring now to FIGS. 7A-7L, a method in process flow by which a MAMR head may be formed, is shown according to one embodiment. As an option, the present method may be implemented to construct structures such as those shown in the other figures. Of course, the present method and others presented herein may be used to form magnetic structures for a wide variety of devices and/or purposes which may or may not be related to magnetic recording. It should be noted that any aforementioned features may be used in any of the embodiments described in accordance with the various methods. It should also be noted that the present method may include more or less steps than those described and/or illustrated in FIGS. 7A-7L, according to various approaches. Moreover, unless otherwise specified, formation of one or more components of the MAMR head may include conventional techniques (e.g., sputtering, plating, atomic layer deposition (ALD), chemical vapor deposition (CVD), ion milling, etc.), as would become apparent to one skilled in the art upon reading the present disclosure. Further, the present method and others presented herein may be carried out in any desired environment.

Figure 7A:
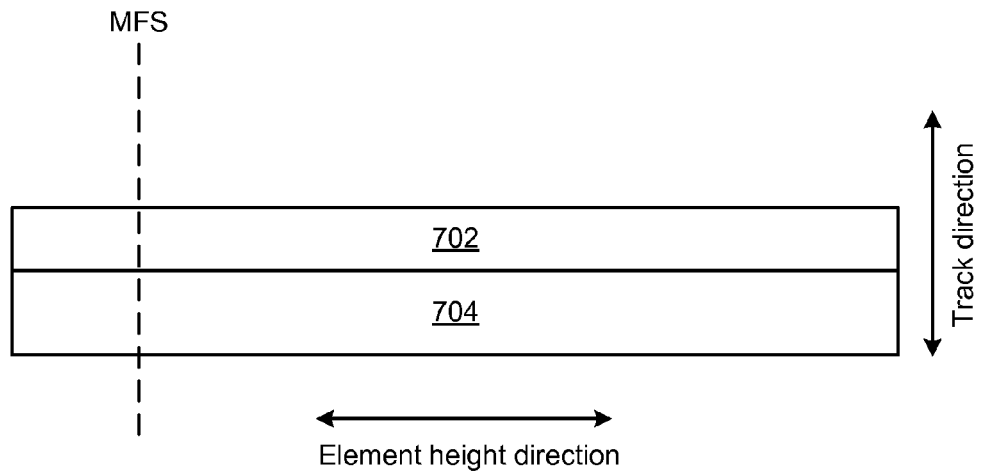
FIGS. 7A-7L provide views of a MAMR head in various intermediate stages of manufacture, illustrating a method for manufacturing a MAMR head, according to one embodiment.

As shown in FIG. 7A, a main pole 702 is deposited above a substrate 704. In various approaches, the main pole 702 may include one or more magnetic metals, such as Fe, Co, Ni, alloys thereof, etc.

Figure 7B:
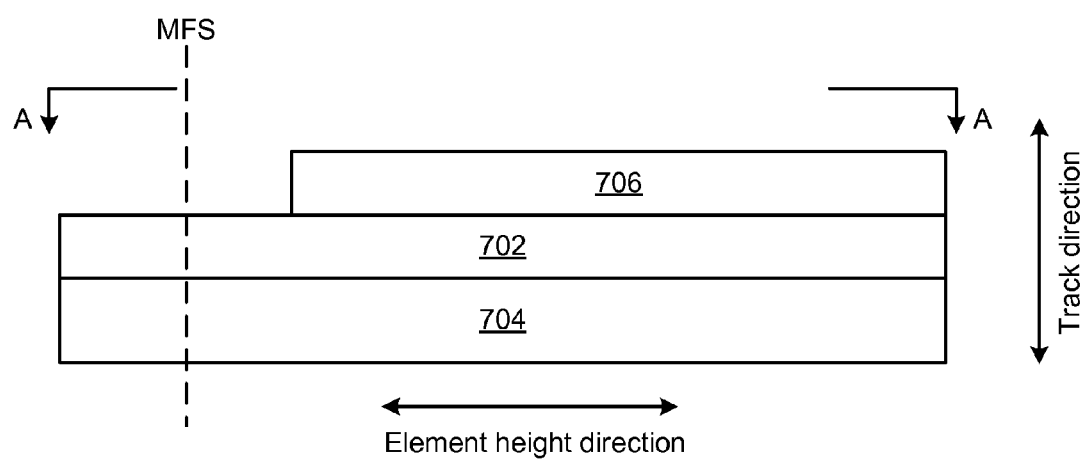
Figure 7C:
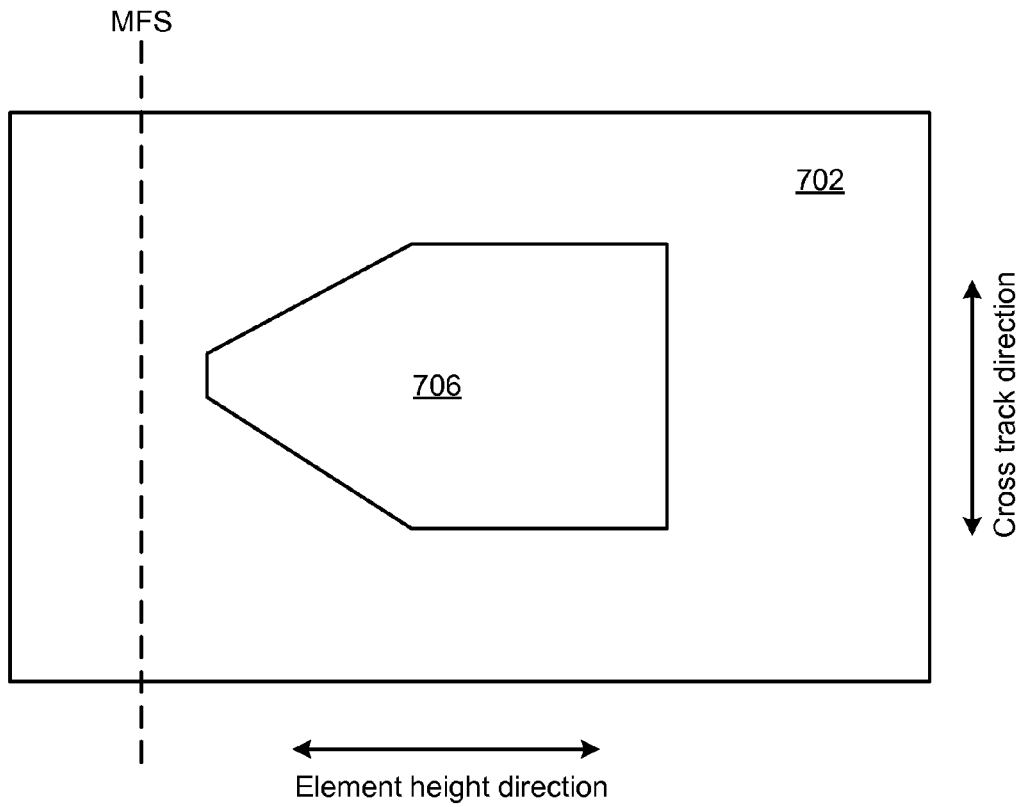

As shown in FIG. 7B, a first mask 706 is formed above a portion of the main pole 702. The first mask 706 may include a layer of photolithographically patterned photoresist, in addition to other layers such as one or more hard mask layers, an image transfer layer, an anti-reflective coating etc. FIG. 7C provides a top down view as seen from line A-A of FIG. 7B.

Figure 7D:
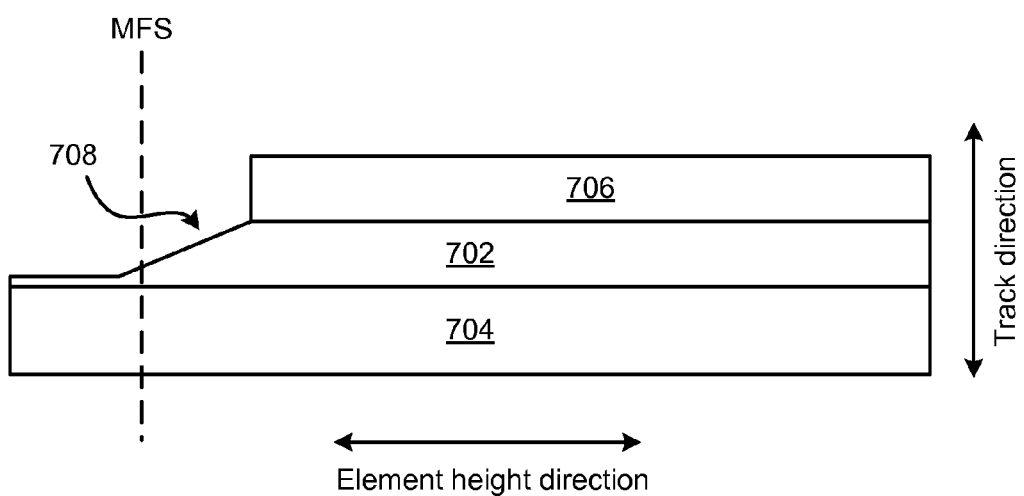

As shown in FIG. 7D, portions of the main pole 702 not covered by the first mask 706 are removed by a first removal process. This first removal process may include ion milling, reactive ion etching (RIE), deep RIE, inductively coupled plasma RIE, or other such removal process as known in the art. In preferred approaches, this first removal process may involve an ion milling process performed in a sweeping manner and at an angle relative to normal so that shadowing from the first mask 706 may cause the ion milling to form the trailing edge tapered (TET) structure of the main pole 702. For instance, after the first removal process, the main pole 702 includes a tapered region 708 near the to-be-defined media facing side (MFS).

Figure 7E:
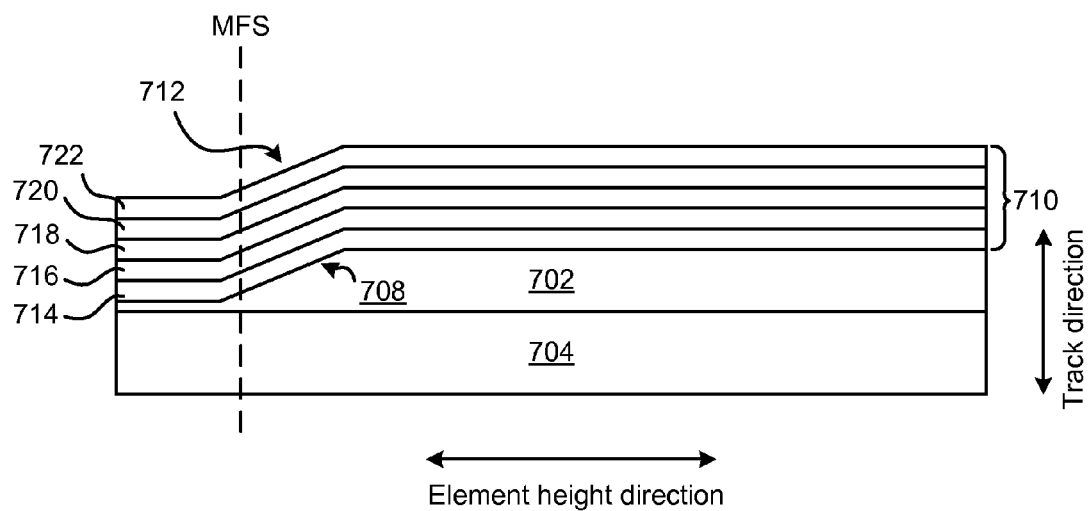

As shown in FIG. 7E, the first mask 706 is removed and an oscillation device 710 is deposited above the main pole 702. Given that the main pole 702 has a TET structure, the oscillation device 710 deposited thereabove also includes a tapered region 712 near the to-be-defined MFS.

The oscillation device 710 may be a spin torque oscillator (STO) and comprise a plurality of layers described below. However, it is important to note that the oscillation device 710 is not limited to a STO, as various other oscillator designs may be used.

As shown in FIG. 7E, the oscillation device 710 includes the following layers in the recited order: an underlayer 714, a spin polarization layer (SPL) 716, an intermediate layer 718, a high-frequency magnetic field generation layer (FGL) 720, and a non-magnetic capping layer 722.

The underlayer 714 may be configured to promote a desired grain growth and magnetization in the layers formed thereabove. In various approaches, the underlayer 714 may include one or more layers that comprise at least one of Cu, Ag, Au, Cr, Ti, Zr, Hf, V, Nb, Ta, Ru, Os, Pd, Pt, Rh, Ir, alloys thereof, etc.

The SPL 716 may preferably have a magnetic anisotropy oriented perpendicular to the plane of deposition (defined by the x-y plane in FIG. 7A), and is configured to provide spin torque to the magnetization of the FGL 720. In various approaches, the SPL 716 may include at least one of CoPt, CoNi, CoPd, CoCrTaPd, or other suitable magnetic material as would become apparent to one having skill in the art upon reading the present disclosure.

The intermediate layer 718 positioned between the SPL 716 and the FGL 720 in the track direction may include one or more non-magnetic materials, such as Au, Ag, Pt, Ta, Ir, Al, Si, Ge, Ti, Cu, Pd, Ru, Cr, Mo, W, alloys thereof, etc.

The FGL 720 may include one or more magnetic materials, including but not limited to FeCo, NiFe, CoPt, CoCr, CoIr, CoFeAli, CoFeGe, CoMnGe, CoFeAl, CoFeSi, CoMnSi, TbFeCo, etc.

The non-magnetic capping layer 722 may include one or more layers that comprise at least one of NiCr, NiFe, Cr, Pt, Ir, Ta, Ru, alloys thereof, etc.

Figure 7F:
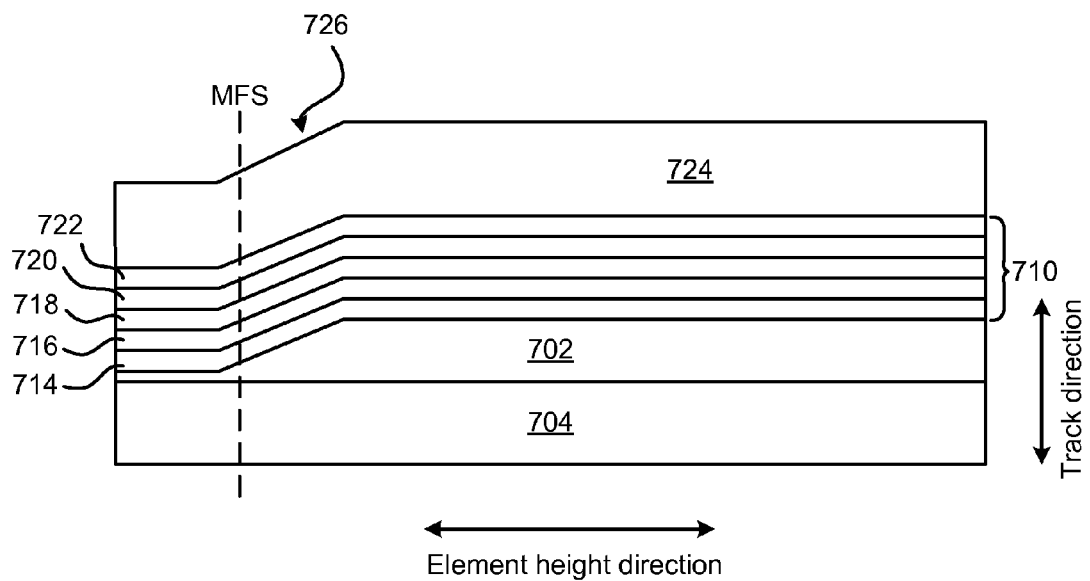

As shown in FIG. 7F, a magnetic capping layer 724 is deposited above the oscillation device 710. The magnetic capping layer 724 also includes a tapered region 726. In various approaches, the magnetic capping layer 724 may include one or more magnetic materials such as Fe, Co, Ni, alloys thereof, etc. In some approaches, the magnetic capping layer 724 may have at least one magnetic material in common with a yet-to-be-formed trailing shield.

Figure 7G:
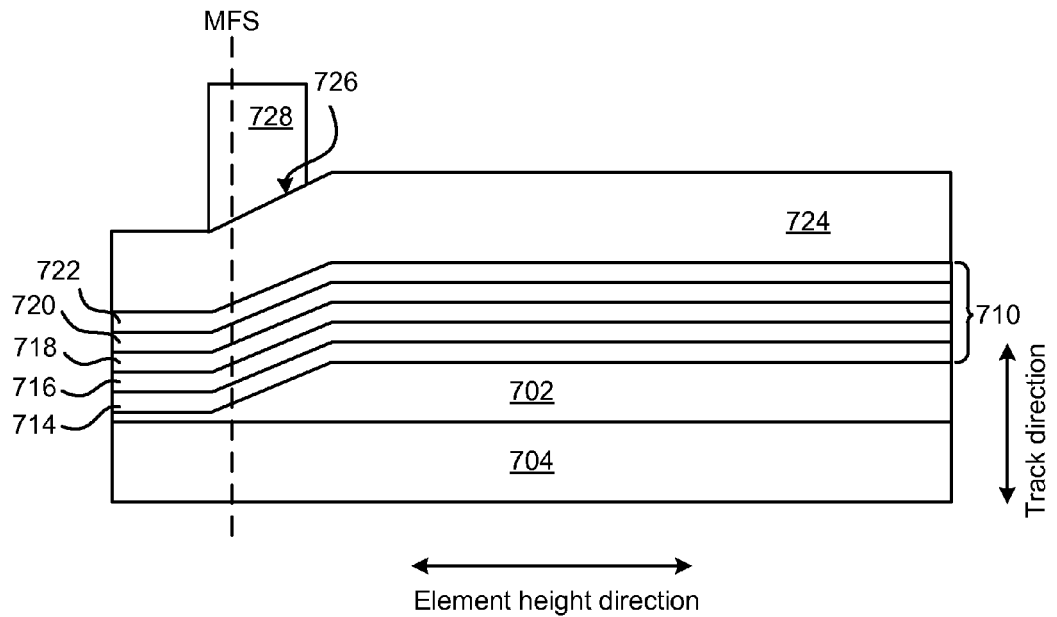

As shown in FIG. 7G, a second mask 728 is formed above at least a portion of the tapered region 726 of the magnetic capping layer 724. The second mask 728 has a shape configured to define a stripe height of the oscillation device 710 and the magnetic capping layer 724 as measured from the MFS. The second mask 728 may include a layer of photolithographically patterned photoresist, in addition to other layers such as one or more hard mask layers, an image transfer layer, an anti-reflective coating etc.

Figure 7H:
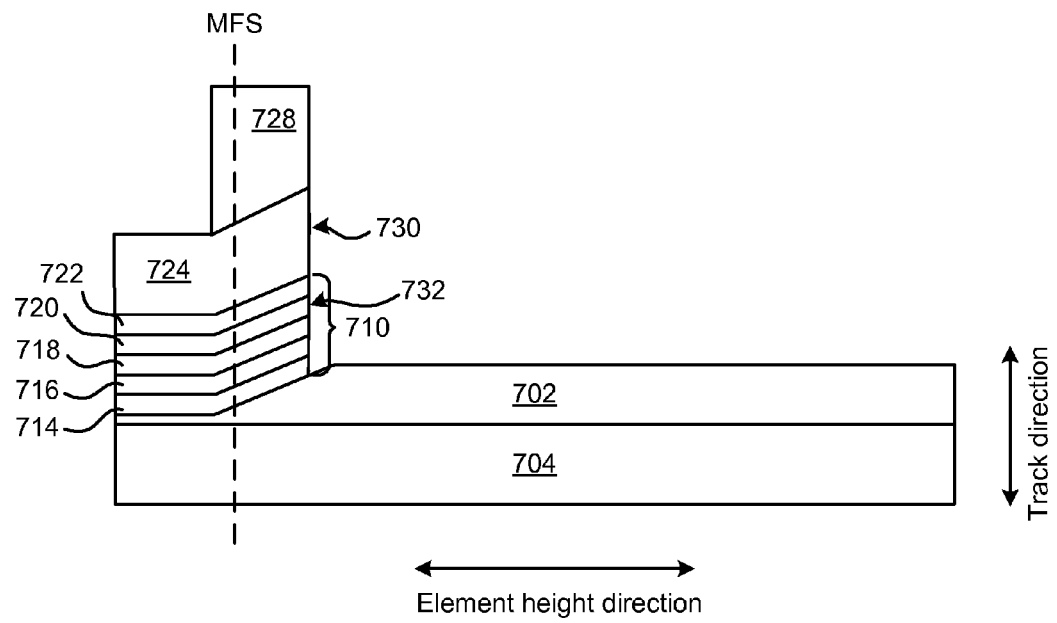

As shown in FIG. 7H, portions of the magnetic capping layer 724 and the oscillation device 710 not covered by the second mask 728 are removed by a second removal process. This second removal process may include ion milling, reactive ion etching (RIE), deep RIE, inductively coupled plasma RIE, or other such removal process as known in the art. After this second removal process, a back edge 730 of the magnetic capping layer 724 and a back edge 732 of the oscillation device 710 are defined.

Figure 7I:
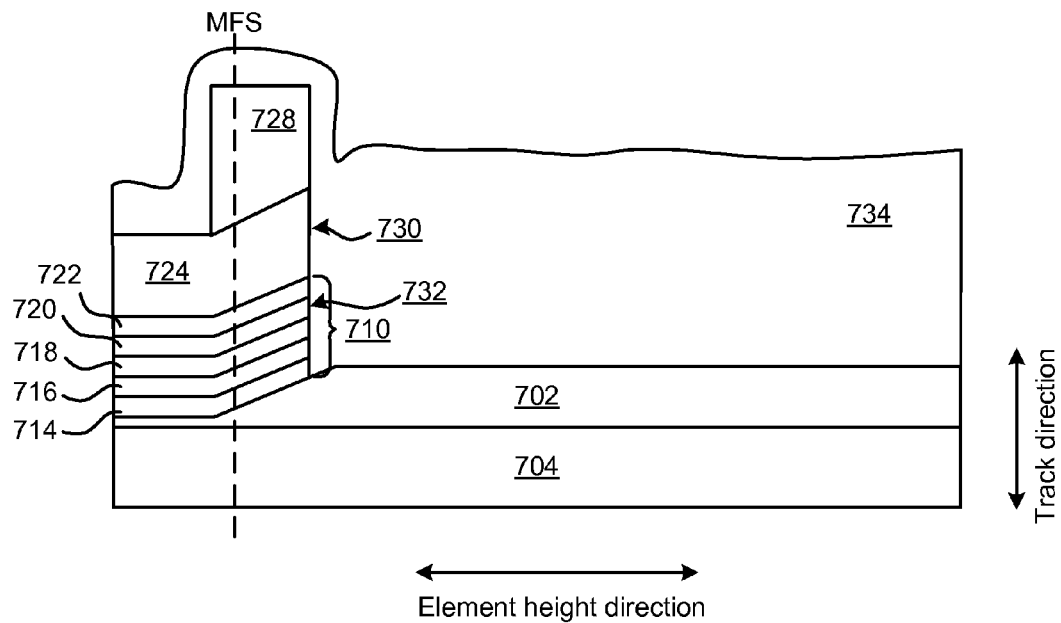

As shown in FIG. 7I, a stripe height (SH) insulation layer 734 is deposited above the second mask 728, as well as portions of the structure left exposed after the aforementioned removal process. The SH insulation layer 734 may comprise a non-magnetic material such as alumina, $TiO_2$, $SiO_2$, $Al_2O_3$—$SiO_2$, etc. In various approaches, the SH insulation layer 734 may be sufficiently thick so as to enable formation of a non-magnetic, self-alignment bump (not shown).

Figure 7J:
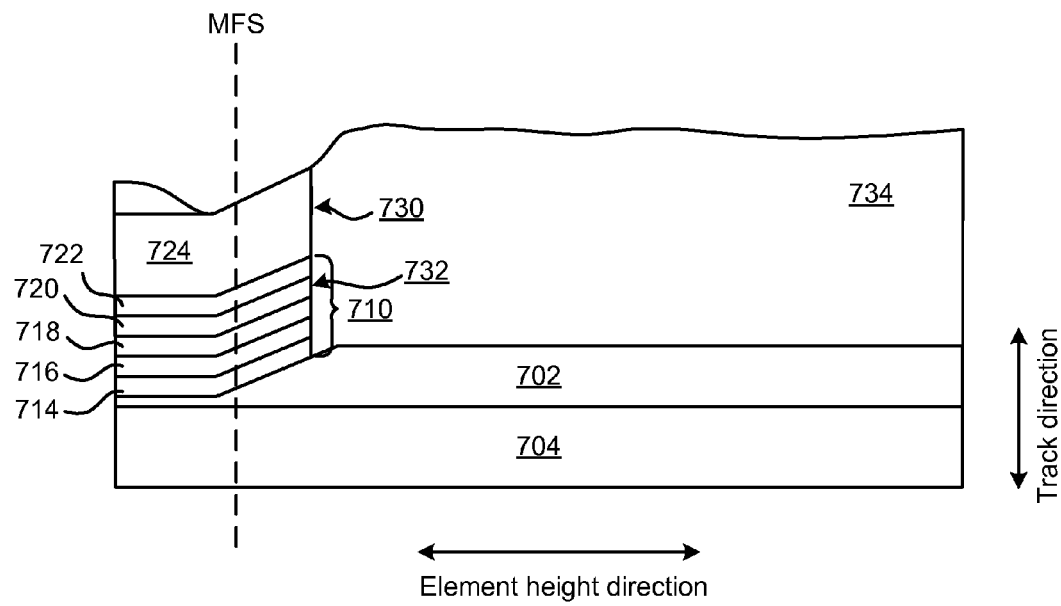

As shown in FIG. 7J, the second mask 728 having the SH insulation layer 734 thereon is removed via a chemical liftoff process, or other such suitable process known in the art. The surface from which the second mask 728 is removed may then be subject to a cleaning process (e.g., chemical mechanical polishing) resulting in the structure of FIG. 7K.

Figure 7K:
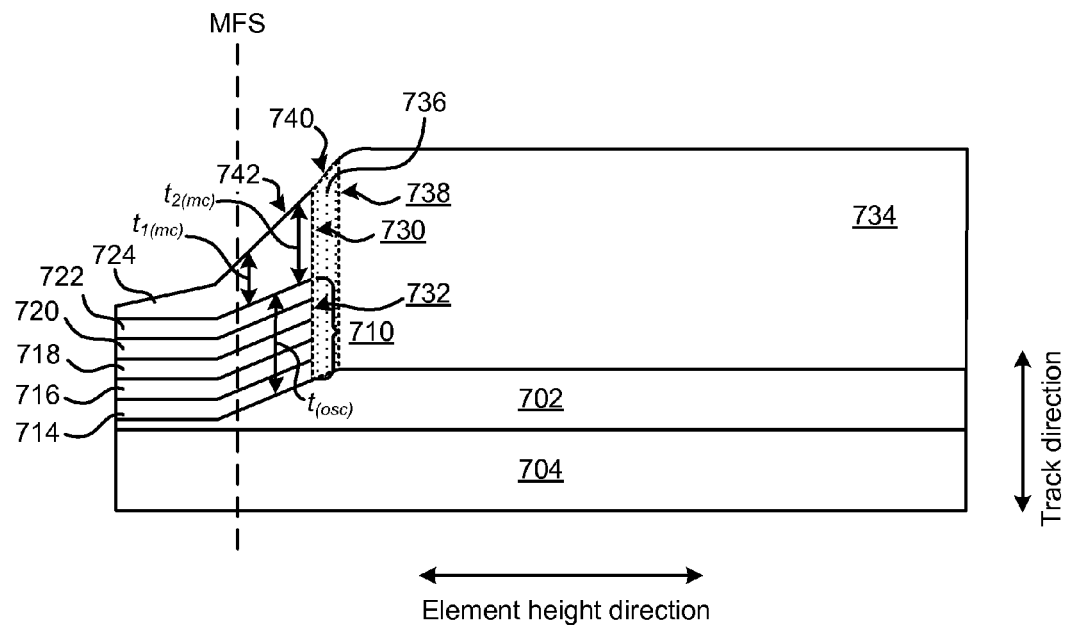

As particularly shown in FIG. 7K, the aforementioned cleaning process may lead to the removal of one or more portions of the magnetic capping layer 724. Accordingly, after the cleaning process, the thickness of the magnetic capping layer 724 may increase from the MFS toward the back edge 730 thereof in the element height direction. Stated another way, the thickness, $t_{1(mc)}$, of the region of the magnetic capping layer 724 near the MFS may be less than the thickness, $t_{2(mc)}$, of the region of the magnetic capping layer 724 near the back edge 730 thereof. In some approaches, the thickness $t_{1(mc)}$ may be in a range from about 4 nm to less than about 25 nm, and the thickness $t_{2(mc)}$ may be in a range from greater than about 4 nm to about 25 nm.

As also shown in FIG. 7K, the aforementioned cleaning process may lead to the removal of one or more portions of the SH insulation layer 734. The SH insulation layer 734 includes a forward region 736 near the back edges 730, 732 of the magnetic capping layer 724 and the oscillation device 710, respectively. The thickness of the forward region 736 of the SH insulation layer 734 may increase (preferably in a substantially linear fashion) toward the back edge 738 thereof in the element height direction relative to the MFS. In some approaches, one or more portions of the upper surface 740 of the forward region 736 of the SH insulation layer 734 may lie in substantially the same plane as one or more portions of the upper surface 742 of the magnetic capping layer 724, where said plane is angled at an angle of inclination (preferably greater than 0° and less than 90°) relative to the plane of deposition of the MAMR head.

It is of note that the presence of the magnetic capping layer 724 may mitigate and/or eliminate the masking effect of a thick SH insulation layer 734 during process variations associated with the cleaning process. For instance, as noted above, after removal of the second mask 728 and prior to the cleaning process, a thick SH insulation layer 734 may be present behind the magnetic capping layer 724 and oscillation device 710 in the element height direction. This thick SH insulation layer 734 may function effectively as a milling mask, thereby making cleaning of the SH insulation layer 734 and the surrounding vicinity difficult. Without the protection of the magnetic capping layer 724, there is a risk of over-cleaning the areas near the thick SH insulation layer 734, areas which include the oscillation device 710. Accordingly, without the protection of the magnetic capping layer 724, the cleaning process may result in the oscillation device 710 having a non-uniform thickness in the element height direction, as seen in conventional MAMR heads that do not have the magnetic capping layer 724 but are otherwise identical to the novel MAMR heads described herein.

However, as evident in FIG. 7K, the magnetic capping layer 724 preserves the total thickness of the oscillation device 710, which may also define the trailing gap thickness, during the cleaning process and other subsequent manufacturing steps. Accordingly, the oscillation device 710 has a uniform thickness, $t_{(osc)}$, in the element height direction (as shown in FIG. 7K), and the cross track direction (not shown).

Figure 7L:
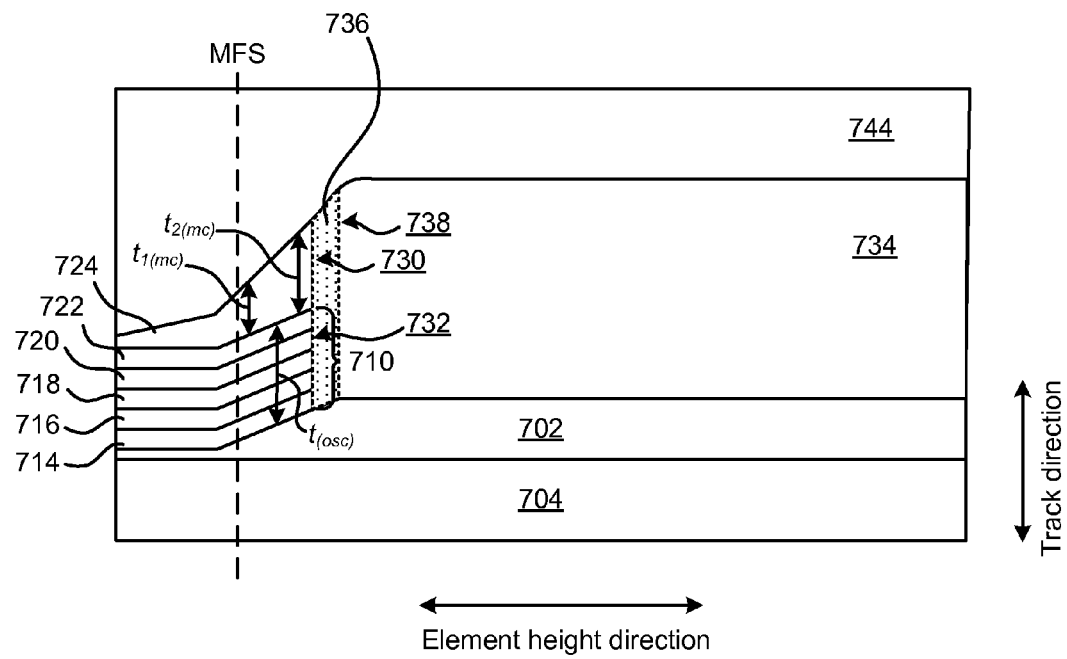

As shown in FIG. 7L, a trailing shield 744 is deposited above the magnetic capping and SH insulation layers 724, 734. The trailing shield 744 may include one or more magnetic materials, such as Fe, Co, Ni, alloys thereof, etc., in various approaches. In some approaches, the trailing shield 744 and the magnetic capping layer 724 may be magnetically coupled. In one particular approach, the trailing shield 744 and the magnetic capping layer 724 may include at least one magnetic material in common.

While not shown in FIG. 7L, a trailing shield seed layer may be positioned between at least the magnetic capping layer 724 and the trailing shield 744. In some approaches, the trailing shield seed layer may include an electrically conductive material, and have a high magnetic saturation moment so as to function as a part of the trailing shield 744. Alternatively, the trailing shield seed layer may be an electrically conductive non-magnetic material (e.g., Ru, Rh, etc.) so as to function as a gap layer and an electroplating seed layer.

It is also important to note that while not shown in FIGS. 7A-7L, the method associated therewith may include additional steps, e.g., to define the width of the oscillation device 710 in the cross track direction, to deposit a track width (TW) insulation layer on either side of the oscillation device 710 and the magnetic capping layer 724 in the cross track direction, etc.

To better understand the benefits of the MAMR heads described above with reference to FIGS. 6A-6C, and the benefits of manufacturing a MAMR head according to a method such as that described above with reference to FIGS. 7A-7L, it is helpful to compare such MAMR heads and method with a prior art method of manufacturing a conventional MAMR head. FIGS. 8A-8G illustrate a typical prior art method of manufacturing a conventional MAMR head.

Figure 8A:
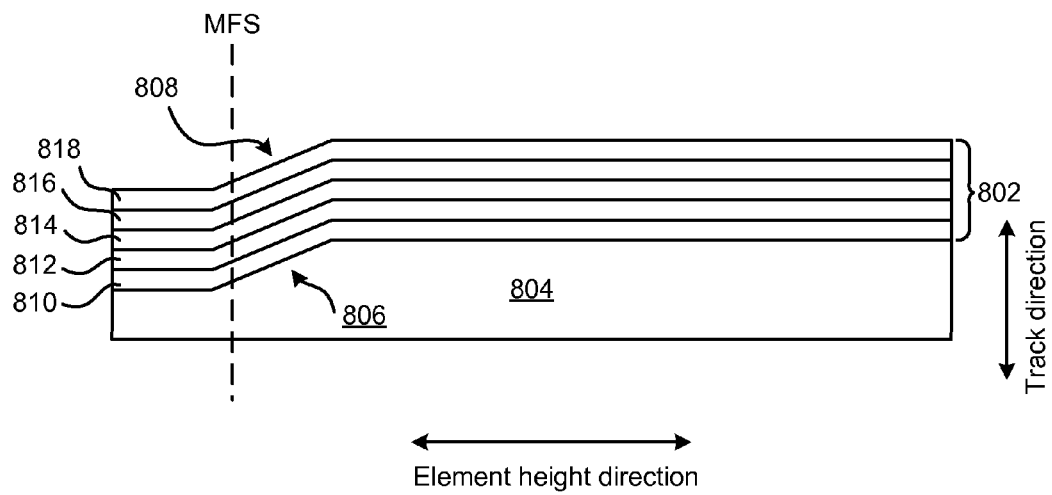
FIGS. 8A-8G provide views of a conventional MAMR head in various intermediate stages of manufacture, illustrating a prior art method for manufacturing a conventional MAMR head.

As shown in FIG. 8A, an oscillation device 802 is deposited above a main pole 804 that has a tapered portion 806 near the to-be-defined media facing side (MFS). Given the trailing edge tapered (TET) structure of the main pole 804, the oscillation device 802 deposited thereabove also includes a tapered region 808 near the to-be-defined MFS.

The oscillation device 802 may be a spin torque oscillator comprising the following layers in order: an underlayer 810, a spin polarization layer (SPL) 812, an intermediate layer 814, a high-frequency magnetic field generation layer (FGL) 816, and a non-magnetic capping layer 818.

Figure 8B:
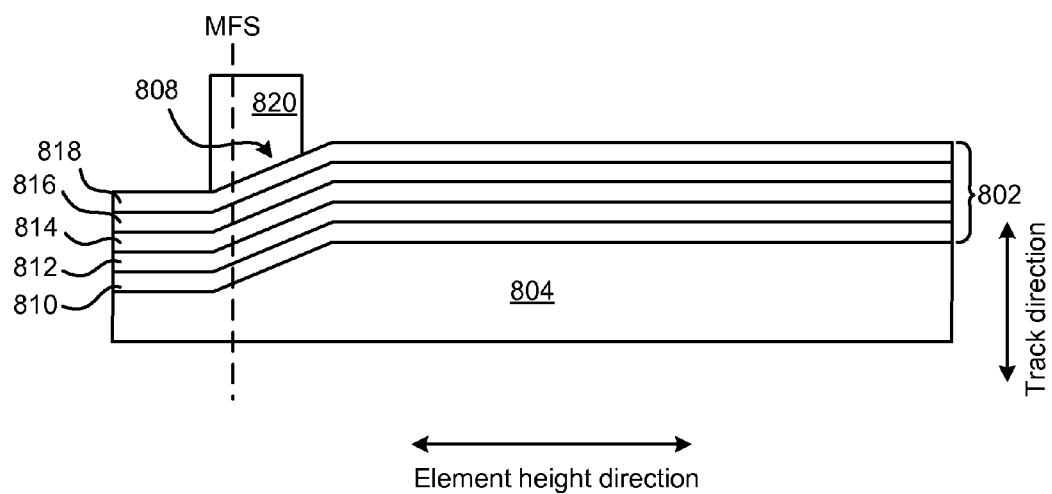

As shown in FIG. 8B, a mask 820 is formed above at least a portion of the tapered region 808 of the oscillation device 802. The mask 820 has a shape configured to define a stripe height of the oscillation device 802 as measured from the MFS. The mask 820 may include a layer of photolithographically patterned photoresist, in addition to other layers such as one or more hard mask layers, an image transfer layer, an anti-reflective coating etc.

Figure 8C:
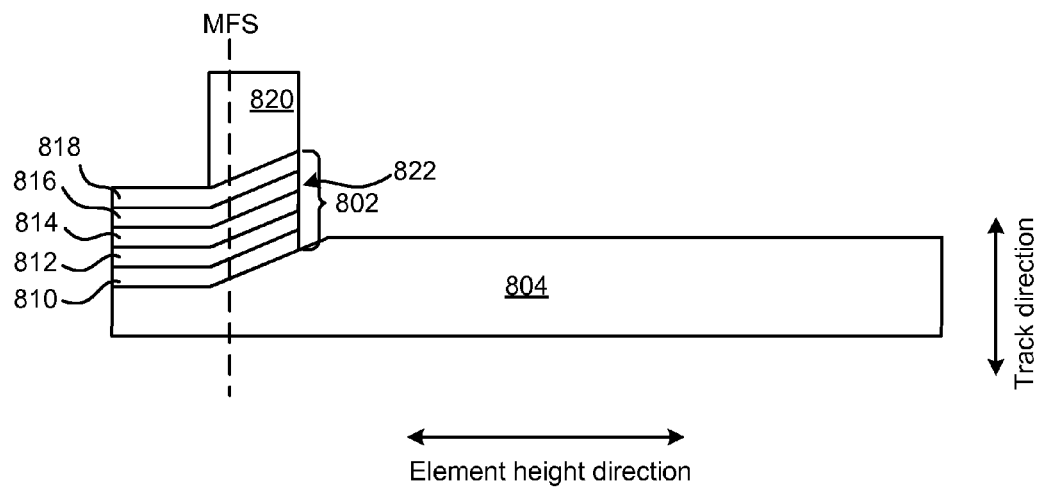

As shown in FIG. 8C, portions of oscillation device 802 not covered by the mask 820 are removed by a removal process. This removal process may include ion milling, reactive ion etching (RIE), deep RIE, inductively coupled plasma RIE, or other such removal process as known in the art. After this removal process, a back edge 822 of the oscillation device 802 is defined.

Figure 8D:
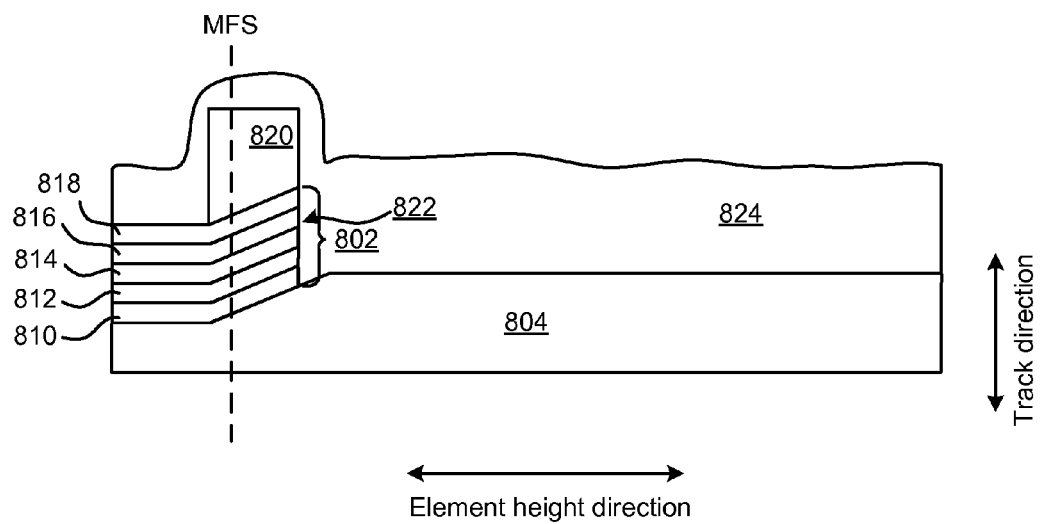

As shown in FIG. 8D, a stipe height (SH) insulation layer 824 is deposited above the mask 820, as well as portions of the structure left exposed after the aforementioned removal process. In various approaches, the SH insulation layer 824 may be sufficiently thick so as to enable formation of a non-magnetic, self-alignment bump (not shown).

Figure 8E:
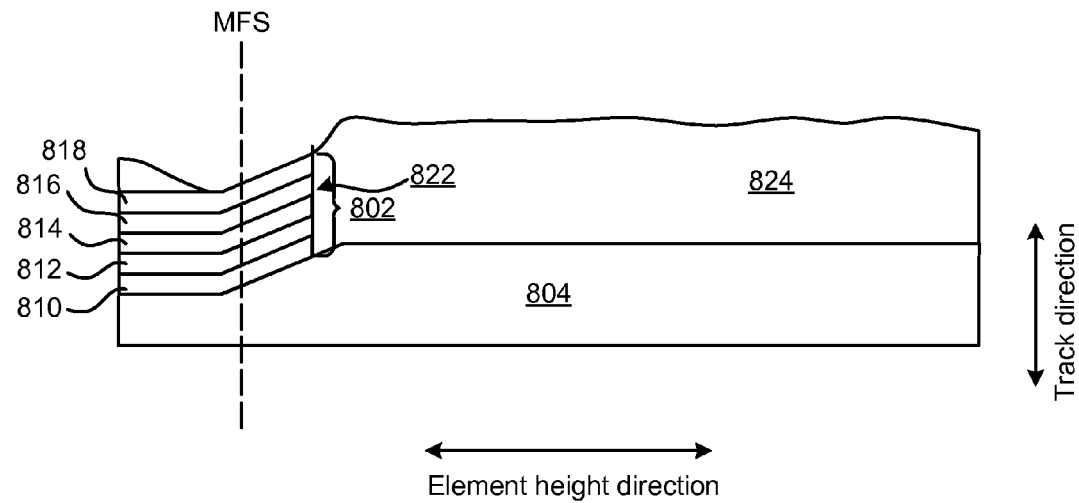

As shown in FIG. 8E, the mask 820 having the SH insulation layer 824 thereon is removed via a chemical liftoff process, or other such suitable process known in the art. The surface from which the mask 820 is removed may then be subject to a cleaning process (e.g., chemical mechanical polishing) resulting in the structure of FIG. 8F.

Figure 8F:
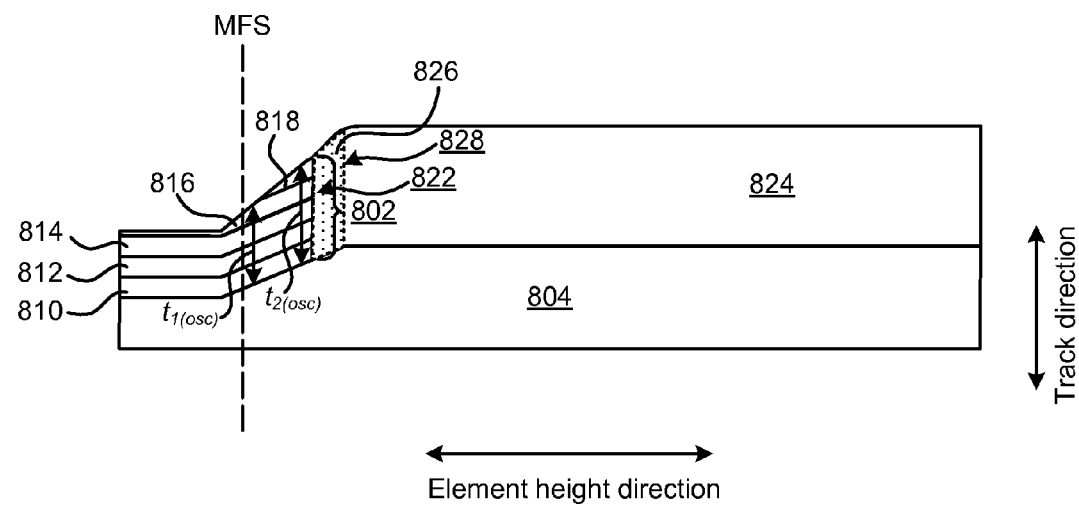

As particularly shown in FIG. 8F, the aforementioned cleaning process may lead to the removal of one or more portions of the SH insulation layer 824. Accordingly, after the cleaning process, the thickness of a forward region 826 of the SH insulation layer 824 may increase toward a back edge 828 thereof in the element height direction relative to the MFS.

As also shown in FIG. 8F, the aforementioned cleaning process may lead to the removal of one or more portions of the oscillation device 802. Accordingly, after the cleaning process, the thickness of the oscillation device 802 (and thus the thickness of the trailing gap) may not be uniform in the element height direction, i.e., the thickness of the oscillation device 802 may increase from the MFS toward the back edge 822 thereof in the element height direction. Stated another way, the thickness, $t_{1(osc)}$, of the region of the oscillation device 802 near the MFS may be less than the thickness, $t_{2(osc)}$, of the region of the oscillation device 802 near the back edge 822 thereof.

It is of note that conventional MAMR heads do not include a magnetic capping layer (such as those disclosed herein) above the oscillation device 802. As such, process variations associated with the cleaning process lead to an undesirable, non-uniform thickness of the oscillating device (and thus the trailing gap). For example, as noted above, after removal of the mask 820 and prior to the cleaning process, a thick SH insulation layer 824 may be present behind the oscillation device 802 in the element height direction. This thick SH insulation layer 824 may function effectively as a milling mask, thereby making cleaning of the insulation layer and the surrounding vicinity difficult. Without the protection of the magnetic capping layer disclosed herein, there is a risk of over-cleaning the areas near the thick SH insulation layer 824, areas which include the oscillation device 802. Accordingly, without the protection of such a magnetic capping layer, the cleaning process causes the oscillation device 802 to ultimately have a non-uniform thickness in the element height direction, as seen in FIG. 8F. Such conventional manufacturing techniques of MAMR heads may thus result in an undesired variation in the thicknesses of their respective oscillation devices (and the trailing gaps), leading to inconsistent reading/writing performance of said MAMR heads.

Figure 8G:
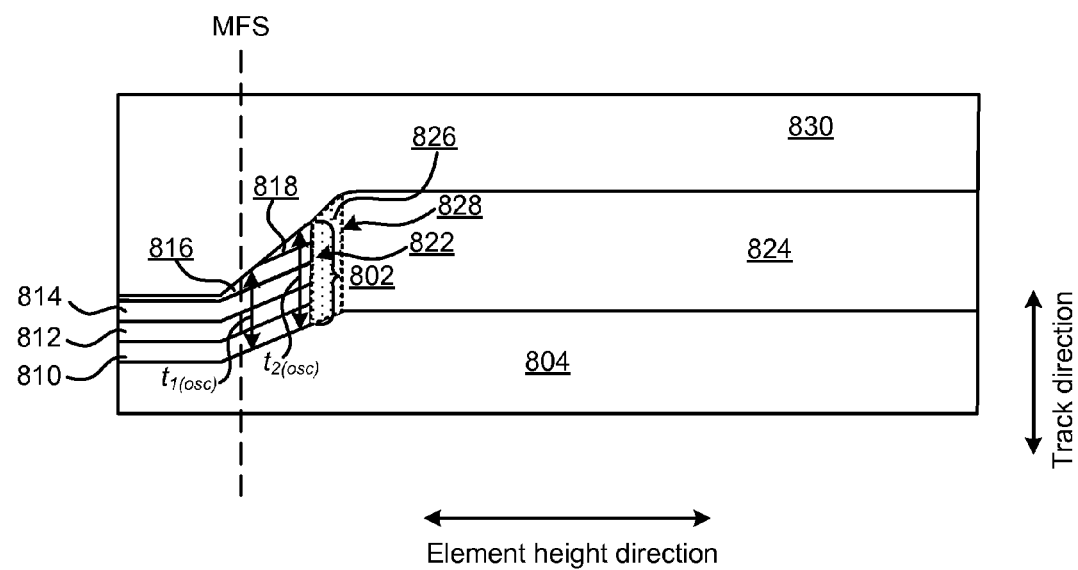

As shown in FIG. 8G, a trailing shield 830 is deposited above the oscillation device 802 and the SH insulation layer 824. While not shown in FIG. 8G, a trailing shield seed layer may be positioned between at least the oscillation device 802 and the trailing shield 830.

It is also important to note that while not shown in FIGS. 8A-8G, the prior art method may include additional steps, e.g., to define the width of the oscillation device 802 in the cross track direction, to deposit a track width (TW) insulation layer on either side of the oscillation device 802 in the cross track direction, etc.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic recording head, comprising:
  a main pole configured to generate a magnetic field for recording data on a magnetic recording medium;

an oscillation device positioned above the main pole in a track direction, the oscillation device being configured to generate a high-frequency magnetic field;

a magnetic capping layer positioned above the oscillation device in the track direction, the magnetic capping layer having a front region at a media facing side (MFS) of the magnetic recording head and a rear region positioned behind the front region in an element height direction, wherein a thickness of the front region of the magnetic capping layer is less than a thickness of the rear region thereof, wherein at least a portion of an upper surface of the magnetic capping layer is angled at a first angle of inclination greater than 0° and less than 90° relative to a plane of deposition of the magnetic recording head, wherein a lower surface of the magnetic capping layer is angled at a second angle of inclination greater than 0° and less than 90° relative to the plane of deposition of the magnetic recording head, the second angle of inclination being less than the first angle of inclination; and a trailing shield positioned above the magnetic capping layer in the track direction.

2. The magnetic recording head as recited in claim 1, wherein a thickness of the front region of the magnetic capping layer is in a range from about 4 nm to less than about 25 nm.

3. The magnetic recording head as recited in claim 1, wherein a thickness of the rear region of the magnetic capping layer is in a range from greater than about 4 nm to about 25 nm.

4. The magnetic recording head as recited in claim 1, wherein the magnetic capping layer comprises one or more magnetic materials.

5. The magnetic recording head as recited in claim 1, wherein the magnetic capping layer comprises at least one magnetic material in common with trailing shield.

6. The magnetic recording head as recited in claim 1, wherein the magnetic capping layer comprises at least one of: Ni, Fe, and Co.

7. The magnetic recording head as recited in claim 1, further comprising a trailing shield seed layer positioned between the trailing shield and the magnetic capping layer.

8. The magnetic recording head as recited in claim 7, wherein the trailing shield comprises an electrically conductive non-magnetic material.

9. The magnetic recording head as recited in claim 1, wherein the upper surface of the magnetic capping layer lies substantially along a plane that inclines along the element height direction from the MFS at the first angle of inclination.

10. The magnetic recording head as recited in claim 1, wherein the oscillation device comprises a spin torque oscillator.

11. The magnetic recording head as recited in claim 1, wherein the oscillation device has a uniform thickness in the element height direction.

12. The magnetic recording head as recited in claim 1, further comprising an insulating layer, portions of which are positioned behind the oscillation device and the magnetic capping layer in the element height direction.

13. The magnetic recording head as recited in claim 12, wherein the insulating layer comprises alumina.

14. The magnetic recording head as recited in claim 12, wherein an upper surface of at least a portion of the insulating layer positioned directly behind a back edge of the oscillation device and a back edge of the magnetic capping layer in the element height direction is angled at a third angle of inclination greater than greater than 0° and less than 90° relative to the plane of deposition of the magnetic recording head, wherein the third angle of inclination is equal to or greater than the first angle of inclination.

15. A magnetic data storage system, comprising:
at least one magnetic recording head as recited in claim 1;
a magnetic medium;
a drive mechanism for passing the magnetic medium over the at least one magnetic recording head; and
a controller electrically coupled to the at least one magnetic recording head for controlling operation of the at least one magnetic recording head.

16. A method for forming a magnetic recording head, comprising:
forming a main pole configured to generate a magnetic field for recording data on a magnetic recording medium;
forming an oscillation device above the main pole in a track direction;
forming a magnetic capping layer above the oscillation device in the track direction, wherein the magnetic capping layer is configured to preserve a thickness of the oscillation device;
defining a stripe height of the oscillation device and a stipe height of the magnetic capping layer;
depositing an insulation layer behind the oscillation device and the magnetic capping layer in an element height direction; and
cleaning an upper surface of the magnetic capping layer and an upper surface of the insulation layer,
wherein after the cleaning: a thickness of a front region of the magnetic capping layer is less than a thickness of a rear region thereof, the front region being positioned at a media facing side (MFS) of the magnetic recording head and the rear region being positioned behind the front region in the element height direction; at least a portion of an upper surface of the magnetic capping layer is angled at a first angle of inclination greater than 0° and less than 90° relative to a plane of deposition of the magnetic recording head; and a lower surface of the magnetic capping layer is angled at a second angle of inclination greater than 0° and less than 90° relative to the plane of deposition of the magnetic recording head, wherein the second angle of inclination is less than the first angle of inclination.

17. The method as recited in claim 16, wherein after the cleaning, the oscillation device has a uniform thickness in the element height direction.

18. The method as recited in claim 16, wherein the oscillation device comprise a spin torque oscillator.

19. The method as recited in claim 16, wherein the magnetic capping layer comprises at least one of: Ni, Fe, and Co.

20. The method as recited in claim 16, further comprising depositing a trailing shield above the magnetic capping layer and the insulation layer in the track direction.

* * * * *